United States Patent
Crowder, Jr.

(10) Patent No.: US 7,278,068 B1
(45) Date of Patent: Oct. 2, 2007

(54) METHOD AND SYSTEM FOR PROVIDING POWER-HIT TOLERANT STATE MACHINES AND DATA STORAGE

(75) Inventor: Robert W. Crowder, Jr., Las Vegas, NV (US)

(73) Assignee: Sierra Design Group, Las Vegas, NV (US)

(*) Notice: Subject to any disclaimer, the term of this patent is extended or adjusted under 35 U.S.C. 154(b) by 515 days.

(21) Appl. No.: 10/794,430

(22) Filed: Mar. 5, 2004

Related U.S. Application Data

(60) Provisional application No. 60/452,327, filed on Mar. 5, 2003.

(51) Int. Cl.
*G06F 11/00* (2006.01)

(52) U.S. Cl. ............................................ 714/100

(58) Field of Classification Search ............... 714/100; 463/24
See application file for complete search history.

(56) References Cited

U.S. PATENT DOCUMENTS

| | | | | |
|---|---|---|---|---|
| 4,607,844 A * | 8/1986 | Fullerton | ............... | 463/24 |
| 4,782,468 A * | 11/1988 | Jones et al. | ............... | 463/24 |
| 4,948,138 A * | 8/1990 | Pease et al. | ............... | 463/24 |
| 6,055,197 A * | 4/2000 | Kato et al. | ............... | 365/200 |
| 6,804,763 B1 * | 10/2004 | Stockdale et al. | ........... | 711/170 |
| 7,207,883 B2 * | 4/2007 | Nozaki et al. | ............... | 463/24 |
| 2005/0176493 A1 * | 8/2005 | Nozaki et al. | ............... | 463/24 |

\* cited by examiner

*Primary Examiner*—Robert Beausoliel
*Assistant Examiner*—Amine Riad
(74) *Attorney, Agent, or Firm*—Steptoe & Johnson LLP

(57) ABSTRACT

A system for providing data restoration in a gaming machine is provided.

8 Claims, 8 Drawing Sheets

*(Embodiment of Present Invention)*

METHOD AND SYSTEM FOR PROVIDING POWER-HIT TOLERANT STATE MACHINES AND DATA STORAGE

CROSS-REFERENCES TO RELATED APPLICATION(S)

The present application claims the benefit of priority under 35 U.S.C. § 119 from U.S. Provisional Patent Application Ser. No. 60/452,327, entitled "GAMING BOARD SET AND GAMING KERNEL FOR GAME CABINETS" filed on Mar. 5, 2003, the disclosure of which is hereby incorporated by reference in its entirety for all purposes.

The present application is also related to U.S. patent application Ser. No. 10/224,026, entitled "GAMING BOARD SET AND GAMING KERNEL FOR GAME CABINETS" filed on Aug. 19, 2002, which claims the benefit of the filing date of provisional application 60/313,743 filed on Aug. 20, 2001, entitled "FORM FITTING UPGRADE BOARD SET FOR EXISTING GAME CABINETS", the disclosures of both of which are hereby incorporated by reference in its entirety for all purposes.

BACKGROUND OF THE INVENTION

This invention pertains generally to gaming systems. More particularly, the present invention relates to a method and apparatus for providing high performance, incremental and large upgrades, and a consistent game development API for gaming cabinets, both existing and new.

Gaming industry cabinets are fairly standardized as to general configuration. This is partly due to the needs of the casinos, who want to fit the maximum number of gaming devices into a given amount of floor space. It is also due to the physical needs of players, who need a certain minimum amount of cabinet area in front of them to play the game while not crowding their fellow players on the next gaming machine. It is also due to the requirements of the game components, encompassing both regulated and non-regulated aspects. Game components include a video monitor or reels, input and output devices (buttons, network interface, voucher or ticket printers, and magnetic strip card readers are typical) together with a main processor board. The main processor board has interfaces to the various input and output devices, and has at least a processor and memory which enables gaming software to be installed and run on the processor board. In most gaming machines the processor board, power supply and other related mechanical and electrical elements are typically co-located near the base of the gaming machine. Disposed thereabove at proximately chest level of the player is the gaming display, such as the rotatable reel displays in a slot machine or a video monitor for video-based games.

FIG. 1 illustrates a common prior art gaming machine. The gaming machine 100 has a top candle 108, a video screen or reel area 102, player input area 104 (generally having buttons, coin-in and/or bill-in, card reader, and in newer machines a printer), and pull handle 106. Gaming machine 100 has, in its interior, a processor board whose location is generally indicated as 110 (the actual processor board and mounting hardware are on the inside of the cabinet).

The processor board, in addition to have physical mounts such as guides, rails, standoff mounts, board slots, board slides, or board tray, will further have cabinet electronic interfaces, typically at the back of the board (towards the front of the cabinet, from a player's perspective). Processor boards will typically have a set of multi-pin plugs or bus connectors that slide into mating plugs or bus connectors when the processor board is correctly seated in its mounts.

FIG. 2 shows a picture of a prior art processor board 200, in this case a processor board from an IGT® Game King® gaming machine. Shown is the top of the board, with the front of the board facing the bottom of the figure. As is typical, the sides of the board slide into the game cabinet using guide rails in the cabinet, with the cabinet bus or connector interfaces 202 mating to specially positioned and configured plugs in the cabinet.

If the board needs work, the entire processor board is replaced. In addition to a replacement board from the manufacturer (in this case IGT®), there are commercially available replacement boards having the same or nearly the same features, speed, memory capacity, etc., from after market manufacturers. No matter where the board originates from, they follow the same configuration, that is, they consist of a single board that replaces the processor board supplied with the game having similar functionality and the same form. In addition to their physical similarity, they employ a monolithic software architecture; that is, the game-cabinet-specific operating system and specific game software are not a modular, layered design using modern software engineering practices. An example of an aftermarket replacement processor board for the IGT® Game King® gaming cabinet is or was sold by Happ Controls™, 106 Garlisch Drive, Elk Grove, Ill. 60007. It has the same basic physical, electronic, and software architecture as the original.

Upgrade processor boards are also available for some games. The reason for considering upgrade boards is that it may be possible to run newer games in a cabinet already owned by a casino if improvements are made to processor speed, memory, graphic support chips, and other components. Game upgrades interface to some degree with the internal busses of the game cabinet, but require cabinet modifications. Currently available upgraded boards do not fit in the slot used by the original processor board; rather, they must be mounted elsewhere in the cabinet. In addition to requiring the accompanying mechanical fabrication and electrical work, the upgrade boards are a fixed upgrade. That is, if the configuration of the upgraded game itself needs to be upgraded a few years later, you have to purchase and install a completely new upgrade kit which requires going through the same installation problems that were encountered with the original upgrade. This is a significant deterrent to upgrading activity.

In addition, each proprietary processor board as well as upgraded game boards typically uses its own interface to the game software, requiring game rewrites each time a hardware upgrade occurs. This makes gradual or incremental game enhancement prohibitively expensive.

Thus, it would be desirable to provide a game processor that is usable in upgrades in existing cabinets, as well as usable for new game cabinets, that is more cost effective, is easier to install, provides for incremental upgrades itself, and provides more standard interfaces to the game development community.

Furthermore, most gaming systems today are embedded systems. Existing gaming systems typically contain limited resources such as processing power, memory, and program storage. Because of these limitations gaming platform programs have generally been implemented as one monolithic program, where all of the code is compiled into one executable program. Monolithic programs which drive the gaming system typically use interrupts to handle all real-time background activities. These interrupts are driven by the hardware components. The interrupts typically process time critical data and place this data or status information into memory variables which are shared by the main line code. Monolithic programs usually have a series of tasks that need to be performed in the main line code. These tasks might include acting on status information from interrupts, and processing player input and other events that drive the gaming application.

The problem with monolithic programs is that the program must be stored in one media device such as an EPROM, series of EPROMs acting as one media device, flash memory devices, or hard drive. Any modification to the monolithic program requires an update to the program storage device. This means that if a bug is found in a particular core feature, such as paying coins from the hopper, then all game programs must be rebuilt and re-released to the regulatory agencies for approval. A core feature modification such as this can require a gaming manufacturer to re-release hundreds of programs. Each program must be retested and approved by the regulatory agencies causing considerable delays and increased costs to the gaming manufacturer.

Another method that gaming manufacturers have performed in the past, is to separate the media that contains the game paytables from the media that contains the monolithic program. The game paytable is typically a table of pay rates that control how the gaming machine program plays and pays out wins. The benefit to this method is that regulatory agencies do not need to retest a paytable if it does not change. By making a modification to the monolithic program, the paytable media stays the same, allowing the regulators to assume the paytable will work as it did before.

While there are some benefits to this method, there are some very constraining drawbacks. First, the paytable media only contains data tables that drive the execution of the game program. The paytable media does not contain executable code. This means the monolithic game program must contain the core gaming system code along with the game code. The program must support all game code and game variations that can be driven by the paytable data media. It is not feasible for a game program to support hundreds of different game variations due to the limited resources of the embedded system. The paytable media can only be changed to effect changes in the game features or payouts that are already in the game program. It is also very difficult to continually maintain the core gaming modules along with all of the hundreds of game modules in the manufacturers library.

Hence, it would also be desirable to provide a gaming system architecture that solves the foregoing issues, as well as others, with respect to separation of operating system and game media.

BRIEF SUMMARY OF THE INVENTION

The present invention overcomes the limitations of the prior art by providing a combination two-board processor board set and a gaming kernel that provides a consistent, easy to use API to game application software. The two-board processor board set includes an industry standard form factor processor board (single board computer system able to support an operating system) coupled with an I/O adapter board. The I/O adapter board is unique for each game machine (game cabinet) application.

The I/O adapter board interfaces the industry standard processor board to the game machine's devices. Further, the I/O adapter is intended to provide functionality not found in the industry standard processor board, such as additional corn ports, stereo sound and additional power for heavier speakers, additional ethernet support, etc.

Further provided is a gaming kernel which uses a UNIX-compatible operating system. The gaming kernel is uniquely architected to both allow game applications to make use of all the hardware features of the game cabinet and the two-board processor board set, while masking all the hardware-specific, low-level differences between game machines (game cabinets) and their player interfacing devices. This is achieved by (i) providing a single API for the game applications, and (ii) building the intelligence for dealing with devices and hardware capabilities into user-level code modules, rather than device-specific drivers inside the operating system. The later in particular is unique, as prior art systems build these capabilities into the lower-level drivers (this method is used by current game machine manufactures), or in some cases it has been proposed to push them out into smart I/O interfaces to enable the use of a common game engine (e.g., see US Application Publication 2001/0053712).

The present invention does not use a common gaming engine like that described in US Applications 2001/0053712 and 2002/0052230, nor does it use two CPUs with only one for gaming as described in US Application 2002/0082084, nor does it describe pushing I/O intelligence out to the peripherals or the I/O board controlling the peripherals, such as described in the PCT Application WO 00/06268. It is different from any of these: it uses an industry standard processor board, but with a game-machine-specific gaming kernel running on the processor board, coupled with a I/O adapter that is as dumb as possible. The intelligence required to run the gaming machine's devices is found in the gaming kernel software, running on the processor board. This discloses and teaches a fundamentally different approach than is currently used in gaming machines or is shown in the art.

In one embodiment, the gaming platform includes a game media having executable game code and game specific information relating to a game application and an operating system media having executable programs and data that are used to provide a plurality of general gaming features. The game media and the operating system media are separated. Changes to either the game media or the operating system media do not affect the other.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
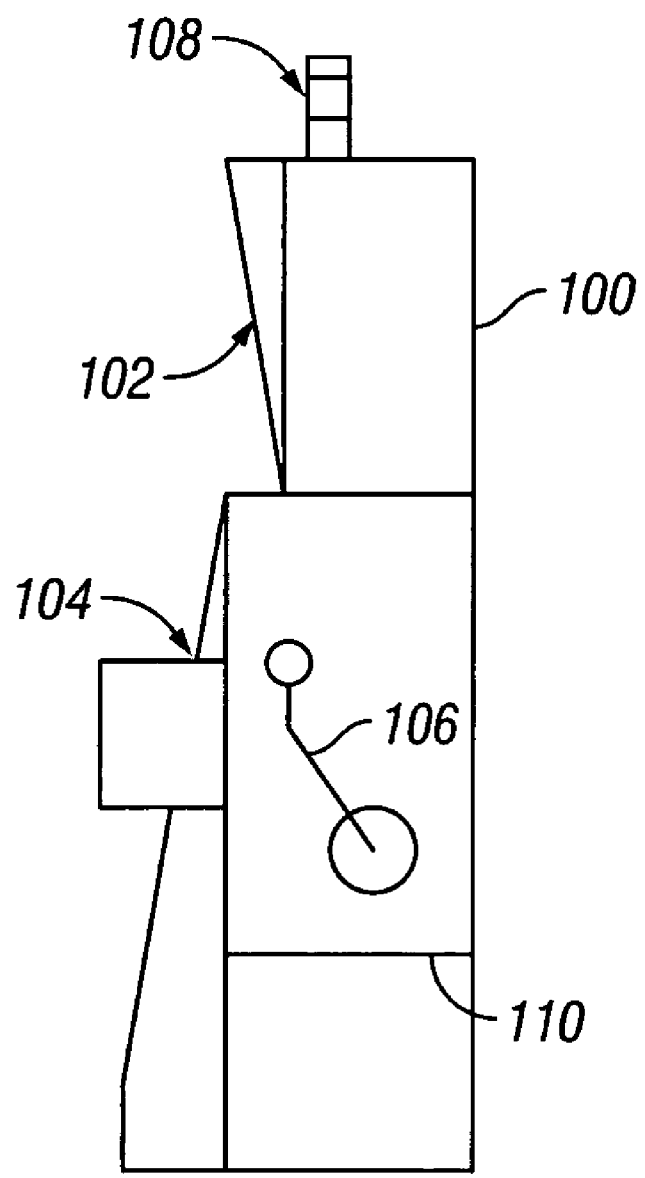
FIG. 1 is a diagram of a prior art game cabinet showing a prior art processor board location.

The present invention in the form of one or more exemplary embodiments will now be described. Persons of ordinary skill in the art will realize that the following description of the present invention is illustrative only and not in any way limiting. Other embodiments of the invention will readily suggest themselves to such skilled persons having the benefit of this disclosure.

Referring to the drawings, for illustrative purposes the present invention is shown embodied in FIG. 1 through FIG. 5. It will be appreciated that the apparatus may vary as to configuration and as to details of the parts, and that the method may vary as to details, partitioning, and the order of acts in a process, without departing from the inventive concepts disclosed herein.

The present invention provides a new and dramatically more cost effective way for owners of aging games (hardware and software) to upgrade their existing cabinets to incorporate new hardware features and capabilities, as well manufacturers of new game cabinets to insure a new, novel, and easy to access upgrade paths to help stave off obsolescence in an industry where games often have lives of 6 months or even less.

The present invention provides for easy hardware and game-level software upgrades (user-level or application level software, from the operating system's viewpoint and when in a modular and layered software environment such as that provided by the present invention), not previously available. This includes being able to easily and economically upgrade hardware that incorporates faster CPUs, busses, etc., as well as incorporating new features such as Ethernet connectivity, stereo sound, and high speed/high resolution graphics. In addition to the ease of upgrading hardware capabilities, the present invention further provides a game kernel which, by providing a callable, consistent user-interface API to the new hardware, makes game programming changes for the game-level programmers minimal after a hardware upgrade. It also provides for backward compatibility, enabling gaming machine owners to upgrade hardware, install the game kernel supporting the new hardware (described in more detail below, but fundamentally installing the libraries that support the added or new hardware capabilities), but wait to upgrade the game software until any later time.

In addition, the game kernel and two-piece processor board introduced in the present invention allows game-level programmers to design and build games using the same game application interface across multiple manufacturers' cabinets, resulting in a huge development savings when compared to the prior art.

Figure 2:
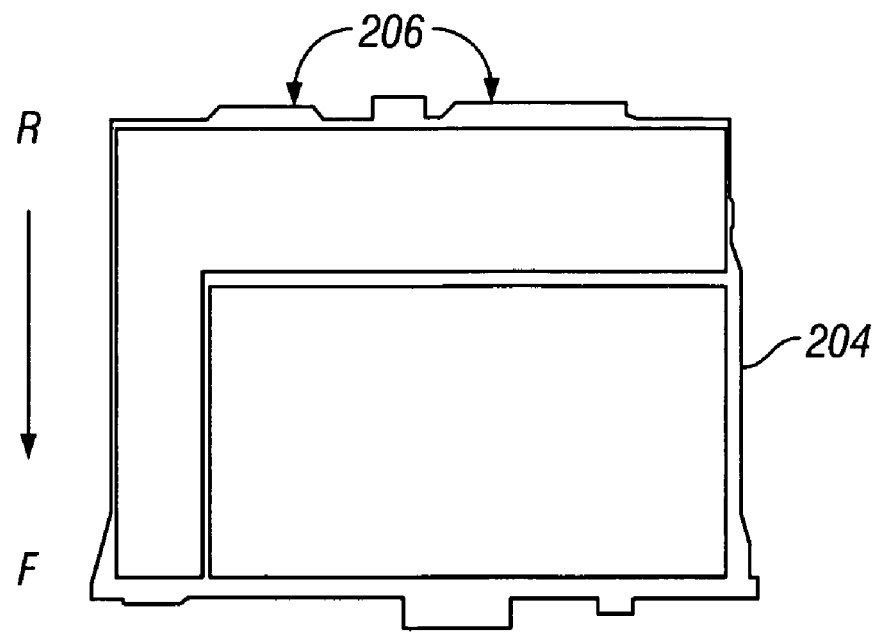
FIG. 2 is a diagram of a prior art processor board and a two-board processor board set according to one embodiment of the present invention.
Figure 2:
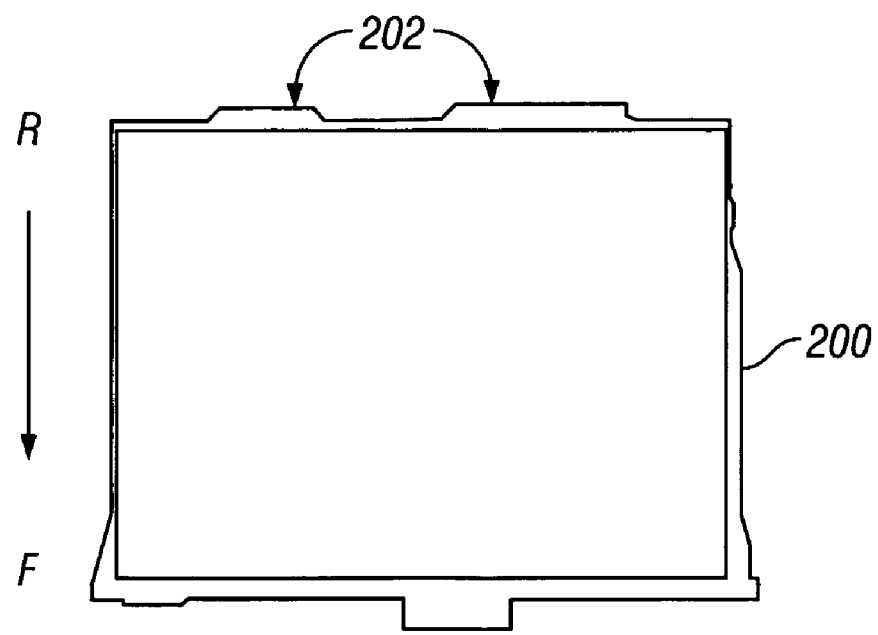

FIG. 2 shows two game processor boards. Board 200 is a prior art processor board from an IGT® game cabinet. Board 204 is a processor board according to the present invention, called a two-board processor board set. Note that it is designed to be a swap-fit with the original, prior art board. It will use the same physical board mounts (slides, guides, rails, etc.) inside the cabinet, and will connect to the cabinet wiring using compatibly placed connectors 206. Note that in any particular replacement board set, there may be some individual connectors, pins, or pin positions not used, because player I/O devices were changed, added, and/or other considerations. However, the supplied connectors will make the game machine (cabinet) functional for game play. For added functionality, there will typically be additional connectors supplied over and above those on the processor board being replaced. This allows the two-board set of the present invention to be a simple swap replacement for the old processor board. This is a huge improvement over other upgrade boards, which require casino personnel to install the prior art replacement processor board in a new physical location within the game cabinet, including figuring out where to mount the new board mounting hardware as well as the attendant problems of fitting new connectors.

For the purposes of this disclosure, the processor board that came with the game cabinet as first delivered from the manufacturer to a customer will be called the OEM (Original Equipment Manufacturer) processor board. Further, the mounting system for the OEM processor board, in whatever form the game cabinet was delivered, is called the OEM mount, mounts, or mounting system. It is to be understood that the OEM mounts may be any implementation, including but not limited to slides, rack-mount, stand-offs, guides, blocks, rails, trays, etc. Whatever mounting system or mounts were used when the game was first manufactured is included in the definition of OEM mount(s).

Figure 3:
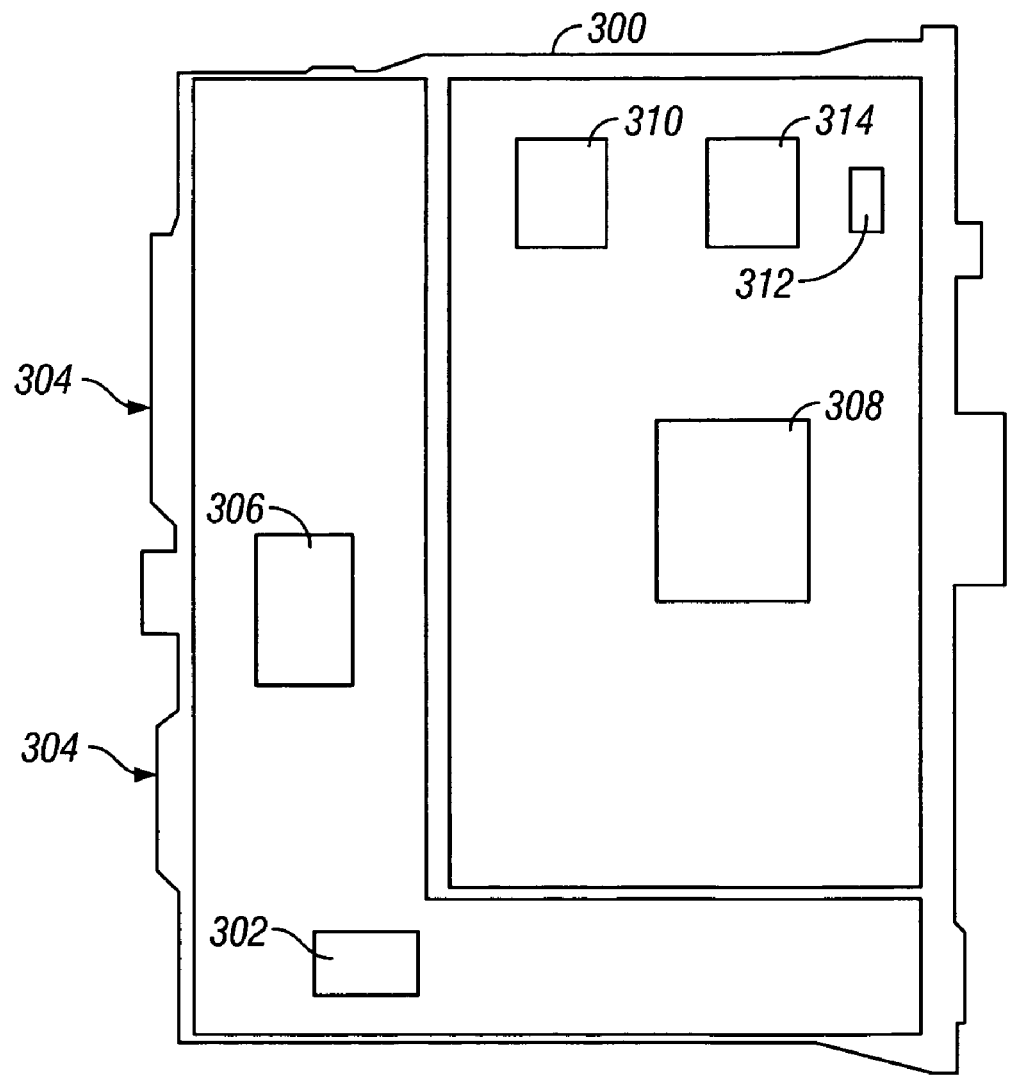
FIG. 3 is an illustration of a two piece replacement processor board according to one embodiment of the present invention.

FIG. 3 shows more details of an example two board set to replace the traditional processor board. A very important feature is that the replacement processor board is made up of two boards, a first board 300 and a second board 306. The two boards are plugged together, using the three visible multi-connector plugs between the two boards (no pointer provided to help keep visual clutter to a minimum).

Board 300 is an industry standard processor board, such as a Netra AX2200 from Sun Microsystems of California, or the SE440BX-2 or CA180 from Intel Corporation of California. Both can be purchased in an industry standard form factors, and are configured to support at least one operating system (including embedded operating systems). By "industry standard form factors", this disclosure means any board form factor that has been agreed to by more than one board manufacturer. Such form factors typically have publicly available specifications, often using an industry funded organization to keep the specifications. One such organization is the Desktop Form Factors Organization, which may be found at www.formfactors.org. Examples of form factors whose specifications may be found there include the ATX, MicroATX, NLX, and FlexATX. There are other industry standard form factors as well. In addition, there are other specifications that are understood to be a consideration in the industry and in the selection of an industry standard form factor for use in the current invention, but are not explicitly discussed in this disclosure. One such consideration is height. Older rack mounted systems might have been based on 4U or 6U racks, with boards having a larger perimeter measurement than desktop form factors. Now, manufacturers are targeting 2U or even 1U racks. Because it is generally the case that height is not an issue in pre-existing game cabinets, height considerations (as well as some other form factors) are not explicitly discussed herein. However, it is to be understood that should such considerations become necessary, all such considerations are included in the description of "form factors" as used herein. Any board having at least a CPU or a CPU socket, having any industry standard form factor, and being designed to be a system in the sense of enabling at least one operating system (including an embedded operating system) to run on it, will be referred to as processor boards for the purposes of the disclosure.

Board 306 is a unique board created by Sierra Design Group (SDG) for the purposes of creating a form fitting and functionally compatible replacement processor board (when coupled with board 300) for the OEM processor board found in game cabinets currently in use. The board set is also intended to be used in new gaming cabinets when new game cabinets are designed from the ground up with the board set of the present invention, with an I/O adapter board designed specifically for the new cabinet. Existing game cabinets used with the present invention might be from IGT®, Bally®, WMS®, or other preeminent game manufacturers. Further, each of these game manufacturers is typically selling several game cabinets, each with their own processor board, at any given time. Board 306 is specially designed and manufactured for each targeted game cabinet, with board 300 and board 306 configured to form a plug-compatible, functionally compatible and functionally enhanced, and form-fit-compatible replacement processor board. As part of this plug-in compatibility, game cabinet interface connectors 304 mate directly with the plugs in the game cabinet for which the processor board is designed. Note that it may be the case that a subset of the pre-existing game cabinet's plugs (or pins in a plug) are used, where the unused plugs (or pins) do not mate to a compatible plug on the processor board set of the present invention. The processor board set is still plug compatible, however, because the remaining plugs (or pins) are designed to be functionally compatible with the subset they do interface with, with the unused plugs (or pins) being taken into consideration during the design of the processor board set such that there will be no interference with the other plugs (or pins), fully enabling a swap-fit.

Thus, it is to be understood that swap-fit does not imply identical connector mappings or identical connector configurations; rather, swap-fit means that the processor board set of the present invention replaces the OEM processor board in such a manner that is uses the OEM mounts, and interfaces to such existing plugs/pins/opto-isolators/connectors/connector-blocks/bus-connectors (collectively: connectors) that enables all player devices to be used in the existing game cabinet to be functionally connected to the processor board set of the present invention.

"Player device" and "player devices" are defined to mean any and all devices that a player may see, hear, touch, or feel. Some are passive (in the sense that a player only receives information from them, such as a video screen and speakers), while others are active (buttons, handles, levers, touchscreens, etc.). Both types are included when using the words "player devises" in general.

Boards such as 306 are called game cabinet adapter and functional enhancement boards, or I/O adapter boards, for the purposes of this disclosure. A processor board coupled with an I/O adapter board is called a two-board processor board set. Note that for certain applications, it may be the case that the applicable I/O adapter board could be made that is an adapter board without additional functional enhancements, to fit an existing game cabinet. This is not expected to be a preferred embodiment, as the cost to provide enhancements (like addition communications ports) is small enough relative to the cost of the overall two-board set as to make the additional functionality well worth the incremental costs.

The creation of a replacement processor board made up of board 300 and board 306, or two-board processor board set, opens many optional upgrading and game enhancement paths for game box manufacturers, game developers, and casino owners. For example, 302 points to a portion of board 306 which incorporates stereo sound capabilities, including an amplifier to drive higher wattage speakers than found in a standard game cabinet. This allows the game software that is running on the two-board processor board set of the present invention (coupled with the gaming kernel), without any changes, to make use of stereo audio output. For best results, the standard mono speakers in the game cabinet should then be upgraded to stereo audio speakers; this can be easily done with the present invention by merely replacing the speakers with new ones. Now the game will suddenly have full stereo sound, able to drive speakers having significantly higher wattage ratings. If the speakers are not upgraded, both signals will be send to the standard plug into the existing game cabinet wiring and speakers, allowing the game to function exactly as before. This enables, at a later date as investment capitol becomes available (or if a new game requires stereo audio capabilities, especially helpful for use with sight impaired game players), the cabinet can be upgraded with new speakers and the stereo output is already available—no further changes will be required. This one example shows how the two-board processor board set allows both hardware and software upgrades in a gradual manner, as investment capitol becomes available. This incremental upgrading capability, including the use of both hardware and software incremental upgrades, has heretofore been unavailable.

Returning now to board 300, a few of its major components are indicated such as processor chip 310 (a socketted Pentium 266 in one preferred embodiment), memory slot 312, and compact flash program storage 310.

Figure 4:
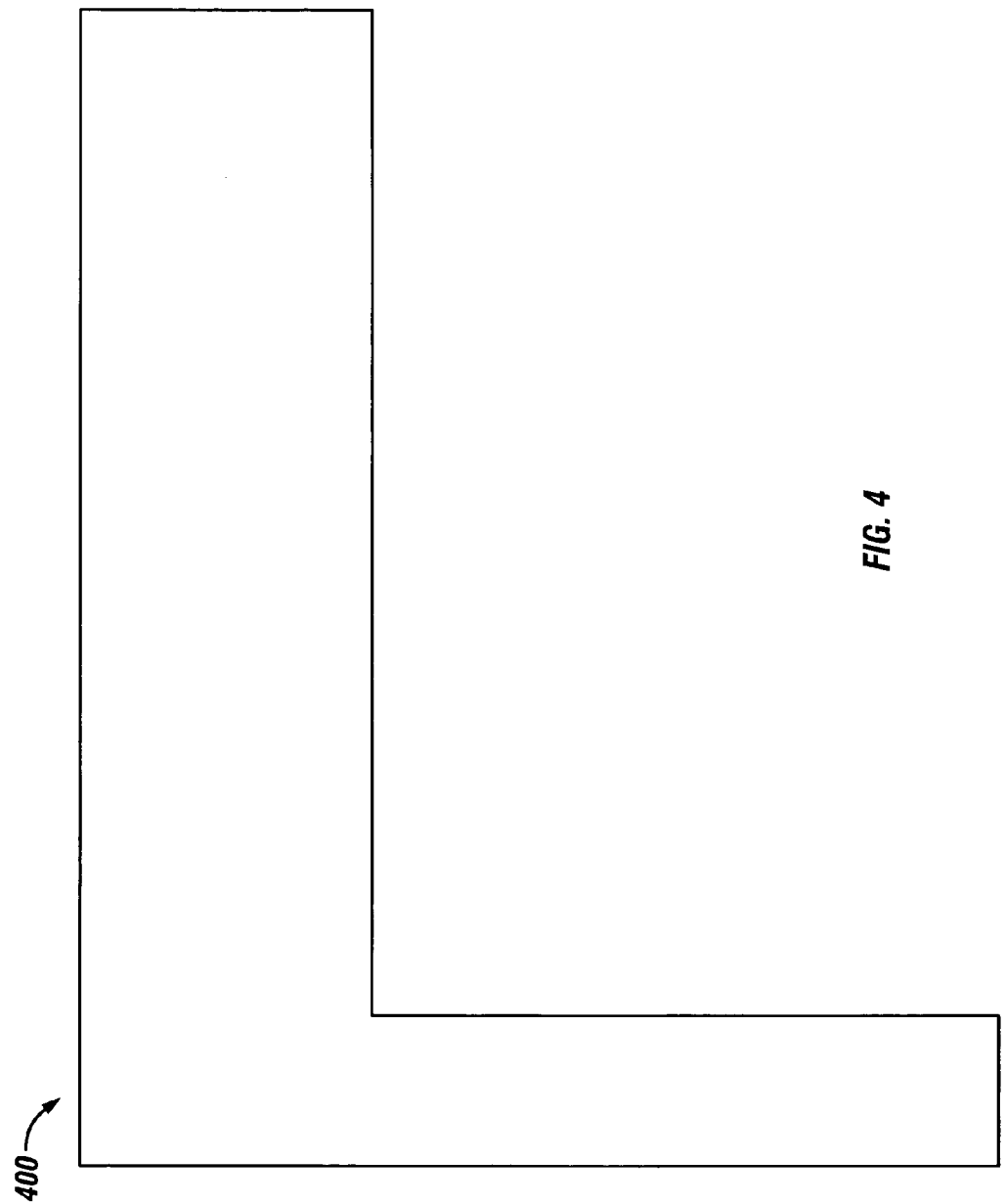
FIG. 4 is a drawing of an I/O adapter board in accordance with one embodiment of the present invention.

Board 306, the I/O adapter board, includes the functionality described below. Further, to see how board 306 looks in more detail and separated from board 300, FIG. 4 shows an illustration of the I/O adapter board 400 in its unpopulated state. The I/O adapter board shown in FIG. 4 is designed for use with an industry standard CPU board having an ATX type form factor, and for use in a popular IGT® game cabinet, forming thereby a swap-fit replacement for the IGT® processor board that came with the game originally. The I/O adapter and processor board provide significantly enhanced functional capabilities.

The functionality of the I/O adapter board may be grouped into two categories. The first category of functionality is that needed to provide, for each particular preexisting game cabinet, the unique optical or electronic interfaces between the game cabinet's existing apparatus and the new processor board. These interfaces will include both basic electronic or optical interfaces, accounting for differences in everything from voltage levels to power needs to basic signal propagation, up to any needed communications protocol translations or interfaces (all this will be very depending on each particular game cabinet and CPU board). In additional to supporting the needed base functionality, in one preferred embodiment each I/O adapter board provides additional functionality and support not previously found in the game cabinet. A primary example of this added support would be an Ethernet connection, which may be used to provide supplemental network support to the game machines, or may be used to replace the older serial communications ports found in existing gaming cabinets. In addition to all this, of course, is simply the increased processing power available from the new processor board. In the case of the I/O adapter board for the IGT® game cabinet illustrated in FIG. 4, functionality includes the following.

Power to the processor board is supplied using voltage and power regulators adapted to use the +13V and +25V power supplies in the game cabinet, to supply regulated power. Four more corn ports are supplied (in addition to the four supplied by the industry standard processor board) for a total of eight corn ports. One corn port is brought to the front of the processor board or tray where it may be used with an optional touchscreen controller.

A VGA port and a keyboard port are supplied in the I/O adapter board to allow a game independent monitor and input/output device to be hooked up to the game cabinet for development, troubleshooting, and monitoring purposes. For this application, the VGA port is also used to drive the game cabinet's standard video monitor.

An Ethernet connection is provided that may be used in addition to, and eventually in place of, the standard game cabinet's serial port connection to RGCs or other gaming equipment, or the rest of the casino's networked infrastructure. The Ethernet may be used to provide two-level authentication, which further enables age verification and other capabilities as described in co-pending application Ser. No. 09/908,878 entitled "Enhanced Player Authentication Using Biometric Identification", incorporated herein by explicit reference. Further, the Ethernet connection may be used to enable the use of web-based interfaces between machines, both locally and remotely.

The IGT® game cabinet currently under discussion uses a proprietary serial multi-drop RS485-based communications channel for several devices on the same wire. The I/O adapter board has been designed to have only the bill validator connected using this particular RS485 channel. Other devices are connected using other serial connectors built into the I/O adapter board. Since other devices, such as touch-screen controllers, are controlled by other interface means provided by the replacement board, resulting in one device coupled to the original single serial line, there is no need for any type of multi-device communications protocol on the RS485 channel. With only a single device on the channel, any issues surrounding the use of a proprietary serial interface for multiple devices are avoided. The I/O adapter board further provides an interface for the game cabinet's SENET circuitry (a readily available protocol), which interfaces to the display lights, player buttons, etc.

Further, the I/O adapter board includes NVRAM with power management and a battery backup to save any needed game device state in the event of a power loss.

Additionally, the I/O adapter board may be reconfigured in the future, and replaced as an individual item separately from the processor board, to incorporate any additional functionality that is needed by newer games, new markets, or newer player input/output devices. Examples include but are not limited to better graphics, better sound, interactive web capabilities using a high speed network connection such as 100 MB Ethernet, multiple game support, audio support for players with limited eyesight capabilities, and newer, more interactive player I/O devices. The same concept holds true of the processor (or CPU) board. The CPU board may be replaced separately from the I/O adapter board. This allows very economical upgrades of the game cabinet to be carried out in those situations where a new CPU board may be all that is needed to support, for example, games requiring a higher performance CPU but nothing else.

Additionally, if the CPU board ever fails, the replacement is significantly less expensive than the older proprietary boards. Not only that, this avoids the problem of finding replacements for aging electronics. Because the two-board processor board set of the present invention uses an industry standard form and function, if existing CPUs, busses, etc., become unavailable (which can happen quickly, given that many designs have a total life span of less than two years now) the game may be kept in operation by replacing the CPU board, or both the I/O adapter board and CPU board. This circumvents the problem of finding replacement electronic components of an older board that are no longer being manufactured.

This further addresses the very significant issue of obsolescing OEM boards. In the high tech industry, after a board product has been out a few years, it becomes increasingly likely that at least some, if not most, of the boards components (chips) will gradually become unavailable. When this happens, it sometimes becomes impossible to continue manufacturing the same OEM boards as replacements for failed boards, even if the original game cabinet manufacturer wanted to continue to supply parts (and many do not, after a certain point in time). The OEM is now faced with re-engineering a new replacement CPU board for an older, low-demand game cabinet. That will rarely ever be done. The two-board processor board set addresses this problem by allowing the I/O adapter board to be produced relatively inexpensively, providing continuing life of older game cabinets through the use of standard form-factor CPU boards with the I/O adapter board.

Figure 5:
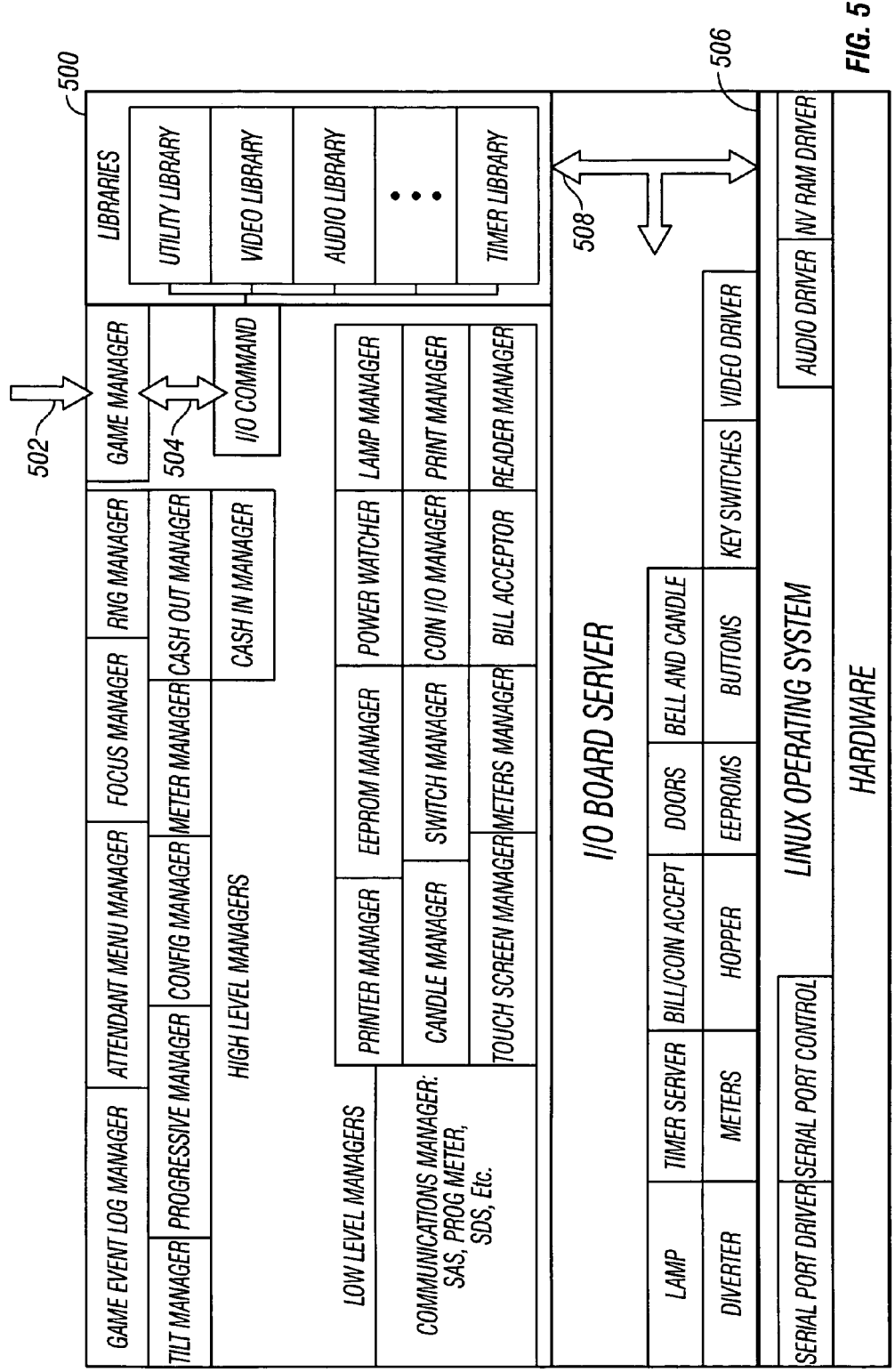
FIG. 5 is a functional block diagram showing a gaming kernel according to one embodiment of the present invention.

FIG. 5 is an functional block diagram of the gaming kernel 500 of the present invention. Game software uses the gaming kernel and two-board processor board set by calling into application programming interface (API) 502, which is part of the game manager.

There are three layers: the two-board processor board set (hardware); the Linux operating system; and, the game kernel layer (having the game manager therein). The third layer executes at the user level, and itself contains a major component called the I/O Board Server. Note the unique architecture of the gaming kernel: ordinarily, the software identified as the I/O Board Server would be inside the Linux kernel as drivers and controllers. It was decided that as many functions normally found in a UNIX (in this case, Linux) kernel would be brought to the user level as possible. In a multi-user or non-dedicated environment, this would cause performance problems and possibly security problems. It has been discovered that in a gaming machine, those risks are manageable. Performance is maintained due to the control of overall system resource drains in a dedicated environment, coupled with ability to choose a suitably fast processor as part of the two-board processor board set. Additionally, gaming software is highly regulated so the ordinary security concerns one would find in an open user environment (or where uncontrolled applications may be run) does not exist in gaming machines. Game application software is well behaved, creating a benign environment as far as attacks from installed software are concerned. To properly set the bounds of game application software (making integrity checking easier), all game applications interact with the gaming kernel using a single API in the game manager. This enables game applications to make use of a well-defined, consistent interface as well as making access points to the gaming kernel controlled, where overall access is controlled using separate processes.

The game manager parses the incoming command stream and, when a command dealing with I/O comes in, it is sent to the applicable library routine (the actual mechanisms used are the UNIX or Linux IPC capabilities). The library routine decides what it needs from a device, and sends commands to the I/O Board Server (arrow 508). Note that a few specific drivers are still in the UNIX/Linux kernel, shown as those below line 506. These are built-in, primitive, or privileged drivers that were (i) general (ii) kept to a minimum and (iii) were easier to leave than extract. In such cases, the low-level communications is handled within UNIX or Linux and the contents passed to the library routines.

Thus, in a few cases library routines will interact with drivers inside the operating system which is why arrow 508 is shown as having three directions (between library utilities and the I/O Board Server, or between library utilities and certain drivers in the operating system). No matter which path is taken, the "smarts" needed to work with each device is coded into modules in the user layer of the diagram. The operating system is kept is simple, stripped down, and common across as many platforms as possible. It is the library utilities and user-level drivers that change for each two-board processor board set, as dictated by the game cabinet or game machine in which it will run. Thus, each game cabinet or game machine will have an industry standard processor board connected to a unique, relatively dumb, and as inexpensive as possible I/O adapter board, plus a gaming kernel which will have the game-machine-unique library routines and I/O Board Server components needed to enable game applications to interact with the game machine (game cabinet). Note that these differences will be invisible to the game application software with the exception of certain functional differences (i.e., if a box or cabinet has stereo sound, the game application will be able make use of the API to use the capability over that of a cabinet having traditional monaural sound).

Examples of the "smarts" built into user-level code of the present invention includes the following. One example is using the I/O library to write data to the gaming machine EEPROM, which is located in the gaming machine cabinet and holds meter storage that must be kept even in the event of power failure. The game manager calls the I/O library function to write data to the EEPROM. The I/O Board Server receives the request and starts a low priority thread within the server to write the data. This thread uses a sequence of 8 bit command and data writes to the EEPROM device to write the appropriate data in the proper location within the device. Any errors detected will be sent as IPC messages to the game manager. All of this processing is asynchronous.

Another example is the button module within the I/O Board Server, which pools (or is sent) the state of buttons every 2 ms. These inputs are debounced by keeping a history of input samples. Certain sequences of samples are required to detect the button was pressed, in which case the I/O Board Server sends an IPC event to the game manager that a button was pressed or released. For some machines with intelligent distributed I/O which debounces the buttons, the button module may be able to communicate with the remote intelligent button processor to get the button events and relay them to the game manager via IPC messages.

Another example is the use of the I/O library for pay out requests from the game application. The I/O Board Server must start the hopper motor, constantly monitor the coin sensing lines of the hopper, debounce them, and send an IPC message to the game manager when each coin is paid.

The I/O library interface has been designed so that the I/O Board Server does not require novram data storage. All novram state flow is programmed in the game manager level (using library utilities) so that it is consistent across all platforms. The I/O Board Server also contains intelligence and a lot of state information. The intelligence needed to interface with each device is found in the combination of I/O library routines and the I/O Board Server.

The use of a UNIX-based operating system allows the game developers interfacing to the gaming kernel to use any of a number of standard development tools and environments available for the UNIX or Linux OS. This is a huge win over the prior art in casino game development, which required game developers to use low level, proprietary interfaces for their games. The use of proprietary, low level interfaces in turn requires significant time and engineering investments for each game upgrade, hardware upgrade, or feature upgrade. The present invention is a very significant step in reducing both development costs and enhancement costs as viewed by game developers. In particular, this will enable smaller game developers to reasonably compete with the larger, more established game developers by significantly reducing engineering time using a UNIX or Linux environment. Savings include but are not limited to reduced development time, reduced development costs, and the ability to use the gaming kernel and its two-board processor board set to market a single game for many game cabinets, spanning multiple game machine vendors. This is a remarkable and significant breakthrough for the gaming industry, being an additional breakthrough beyond simply providing a standard Unix-like interface to a game developer.

Some gaming kernel components are next described. The gaming kernel of the present invention is also called the Alpha Game Kit kernel or Alpha Game Kit game kernel, abbreviated AGK game kernel or AGK kernel.

The Game Manager provides the interface into the AGK game kernel, providing consistent, predictable, and backwards compatible calling methods, syntax, and capabilities (game application API). This enables the game developer to be free of dealing directly with the hardware, including the freedom to not have to deal with low-level drivers as well as the freedom to not have to program lower level managers (although lower level managers may be accessible through the Game Manager's interface if a programmer has the need). In addition the freedom derived from not having to deal with the hardware level drivers and the freedom of having consistent, callable, object oriented interfaces to software managers of those components (drivers), the game manager provides access to a set of upper level managers also having the advantages of consistent callable, object oriented interfaces, and further providing the types and kinds of base functionality required in all casino-type games. The game manager, providing all the advantages of its consistent and richly functional interface as support by the rest of the AGK kernel, thus provides the game developer with a multitude of advantages.

The Game Manager has several objects within itself, including an Initialization object. The Initialization object performs the initialization of the entire game machine, including other objects, after the game manager has started its internal objects and servers in appropriated order. In order to carry out this function, the Configuration Manager is amongst the first objects to be started; the Configuration manager has data needed to initialize (correctly configure) other objects or servers.

After the game is brought up (initialized) into a known state, the Game Manager checks the configuration and then brings either a game or a menu object. The game or menu object completes the setup required for the application to function, including but not limited to setting up needed callbacks for events that are handled by the event manager, after which control is passed back to the Game Manager. The Game Manager now calls the game application to start running; the game machine is made available for player use.

While the game application is running (during game play, typically), the application continues to make use of the Game Manager. In addition to making function calls to invoke functionality found in the AGK kernel, the application will receive, using the callbacks set up during initialization and configuration, event notification and related data. Callback functionality is suspending if an internal error occurs ("Tilt event") or if a call attendant mode is entered. When this state is cleared, event flow continues.

In a multi-game or menu-driven environment, the event callbacks set by a game application during its initialization are typically cleared between applications. The next application, as part of its initialization sequence, sets any needed callbacks. This would occur, for example, when a player ends one game, invokes a menu (callbacks cleared and reset), then invokes a different game (callbacks cleared and reset).

The Game Event Log Manager is to provide, at the least, a logging or logger base class, enabling other logging objects to be derived from this base object. The logger (logger object) is a generic logger; that is, it is not aware of the contents of logged messages and events. The Log Manager's job is to log events in NVRAM event log space. The size of the space if fixed, although the size of the logged event is not. When the event space or log space fills up, a preferred embodiment will delete the oldest logged event (each logged event will have a time/date stamp, as well as other needed information such as length), providing space to record the new event. In this embodiment the latest events will be found in NVRAM log space, regardless of their relative importance. Further provided is the capability to read the stored logs for event review.

The Meter Manager manages the various meters embodied in the AGK kernel. This includes the accounting information for the game machine and game play. There are hard meters (counters) and soft meters; the soft meters are stored in NVRAM to prevent loss. Further, a backup copy of the soft meters is stored in EEPROM. In one preferred embodiment, the Meter Manager receives its initialization data for the meters, during startup, from the Configuration (Config) Manager. While running, the Cash In and Cash Out Managers call the Meter Manager's update functions to update the meters, and the Meter Manager will, on occasion, create backup copies of the soft meters by storing the soft meters readings in EEPROM; this is accomplished by calling and using the EEPROM Manager.

The Progressive Manager manages progressive games playable from the game machine. It receives a list of progressive links and options from the Config Manager on startup; the Progressive Manager further registers progressive event codes ("events") and associated callback functions with the Event Manager to enable the proper handling of progressive events during game play, further involving other components such as Com Manager, perhaps the Meters Manager, and any other associated or needed modules, or upper or lower level managers. This enables the game application to make use of a progressives known to the game machine via the network in the casino; the progressives may be local to the casino or may extend beyond the casino (this will be up to the casino and its policies).

The Event Manager object is generic, like the Log Manager. The Event Manager does not have any knowledge of the meaning of events; rather, its purpose is to handle events. The Event Manager is driven by its users; that is, it records events as passed to it by other processes, and then uses its callback lists so that any process known to the Event Manager and having registered a callback event number that matches the event number given to the Event Manager by the event origination process, will be signaled ("called"). Each event contains fields as needed for event management, including as needed and designed, a date/time stamp, length field, an event code, and event contents.

The Focus Manager object correlates which process has control of which focus items. During game play, objects can request a focus event, providing a callback function with the call. This includes the ability to specify lost focus and regained focus events. In one embodiment, the Focus Manager uses a FIFO list when prioritizing which calling process gets their callback functions handled relating to a specific focus item.

The Tilt Manager is an object that receives a list of errors (if any) from the Configuration Manager at initialization, and during play from processes, managers, drivers, etc., that generate errors. The Tilt Manager watches the overall state of the game, and if a condition or set of conditions occur that warrant it, a tilt message is sent to the game application. The game application then suspends play, resumes play, or otherwise responds to the tilt message as needed.

The Random Number Generator Manager is provided to allow easy programming access to a random number generator (RNG), as a RNG is required in virtually all casino-style (gambling) games. The RNG Manager includes the capability of using multiple seeds by reading RNG seeds from NVRAM; this can be updated/changed as required in those jurisdictions that require periodic seed updates.

The Credit Manager object manages the current state of credits (cash value or cash equivalent) in the game machine. The Cash In and Cash Out objects are the only objects that have read privileges into the Credit Manager; all other objects only have read capability into the public fields of the Credit Manager. The Credit Manager keeps the current state of the credits available, including any available winnings, and further provides denomination conversion services.

The Cash Out Manager has the responsibility of configuring and managing monetary output devices. During initialization the Cash Out Manager, using data from the Configuration Manager, sets the cash out devices correctly and selects any selectable cash out denominations. During play, a game application may post a cash out event through the Event Manager (the same way all events are handled), and using the callback posted by the Cash Out Manager, the Cash Out Manager is informed of the event. The Cash Out Manager updates the Credit Object, updates its state in NVRAM, and sends an appropriate control message to the device manager that corresponds to the dispensing device. As the device dispenses dispensable media, there will typically be event messages being sent back and forth between the device and the Cash Out Manager until the dispensing finishes, after which the Cash Out Manager, having updated the Credit Manager and any other game state (such as some associated with the Meter Manager) that needs to be updated for this set of actions, sends a cash out completion event to the Event Manager and to the game application thereby.

The Cash In Manager functions similarly to the Cash Out Manager, only controlling, interfacing with, and taking care of actions associated with cashing in events, cash in devices, and associated meters and crediting.

Further details, including disclosure of the lower level fault handling and/or processing, are included in the provisional from which this utility application receives date precedence, entitled "Form Fitting Upgrade Board Set For Existing Game Cabinets" and having No. 60/313,743, said provisional being fully incorporated herein by explicit reference.

Various features of the present invention will now be described in further detail. In one exemplary aspect, the present invention provides a system having an inexpensive memory design and file system software that can reliably recover data after abrupt losses of power. Two aspects of this design deserve emphasis. First, the system recovers data sets, not just unrelated entries; second, the system performs this recovery automatically at the file system level, obviating the need for a special application that attempts recovery.

A "data set" is one or more pieces of data that correspond to one another (database users would use the synonym "record" to describe a data set). If part of a data set is written when power goes off, traditional, non-volatile memory can retrieve those parts that were written—but cannot reveal that the data set is somehow corrupt. Note that the corruption is not due to a failure of the memory devices. Such corruption is caused by the computer stopping the write operation part way through the set due to the power interruption.

Applications trying to store precious data in non-volatile memory traditionally pre-assign memory locations to the data items that will be stored. For large or general-purpose applications, this approach becomes difficult to manage, even using files to help with the coordination of such assignments (XML, for instance). The system of the present invention uses file system software to provide access to the memory, thus allowing independent concerns to store their data in independent files. For devices that are released in a series of versions, the file system approach is less prone to version-to-version incompatibilities that can generate confusion for developers, users, and support personnel.

The following describes one possible implementation of the new design. In one implementation, the system uses one (1) Megabyte of memory in two (2) memory chips, 64-byte blocks, the ext3 as a model for the file system on a Unix-like computer, and checksums for error detection. The system can accommodate one or more memory chips, other file system designs, non-Unix operating systems, and CRCs etc. for error detection. For the sake of brevity, the overall system is simply referred to as 'Nvram', though its recovery capabilities are much stronger than traditional nvram (non-volatile random access memory).

Nvram is redundant, meaning that the physical memory is divided into two (2) equal-sized "banks" which keep identical copies of the data. Placed at regular intervals in each bank are special "error detection numbers", for example "checksums", which are used to tell if its area of the memory contains an error, perhaps caused by the power going out while data was being written. When a data set is written to Nvram, the error detection value is not updated until the entire data set is completely written. This operation is then repeated for the redundant memory bank. If a power outage strikes midway through the write to the first bank, the corrupt state will be detected on power up and the partially written data will be discarded. If the power outage occurs during the writing of the second bank, that bank's data will be discarded and the data set, successfully written to the first bank, will become the system's only copy.

The recovery algorithm is embedded in the driver and is activated whenever a block of memory is read. When power is re-supplied, the startup logic "mounts" all file systems, including the Nvram file system. A part of the mount logic, inside the Nvram driver, causes all of Nvram memory to be read, thus executing the recovery algorithm on all of Nvram memory before any client program starts running. During every subsequent read, the same algorithm checks the integrity of the block being read and performs recovery if necessary.

In one exemplary aspect, the recovery algorithm operates as follows: (1) Determine if the driver was configured (at startup time) to treat physical memory as two (2) redundant banks. This configuration can be run if the applications do not need the extensive recovery protections. If configured for recoverable storage, go to step 3. (2) Using the block number supplied to the algorithm, compute the memory address of the block. Read that block and return it to the caller without any validation. (3) Using the block number supplied to the algorithm, compute the memory address of the block. This address is valid for either bank. Read that block from the first bank. (4) Using the same address, read the corresponding block from the second bank. (5) Using the block number supplied to the algorithm, compute the location of the error detection value for this block. Read one error detection value from the first bank. (6) Read the error detection value from the second bank. (7) For the block read in step (3), compute the error detection value. Compare the computed value to the value read in step (5). (8) For the block read in step (4), compute the error detection value. Compare to the computed value read in step (6). (9) If there are no discrepancies found in steps (7) and (8), return to the caller with the data read in step (3). (10) If there are discrepancies found in steps (7) and (8), return an "unrecoverable memory error" to the operating system/file system. (11) If a discrepancy was found only in step (7), representing an error in the first bank, copy the data from the second bank into the memory area for this block in the first bank. (12) If a discrepancy was found only in step (8), representing an error in the second bank, copy the data from the first bank into the memory area for this block in the second bank.

Internal Structure

In one implementation, the Nvram memory has a total of one (1) Megabyte of memory which is 1048576 bytes. This is also 1024 Kilobytes, so each bank of Nvram is said to be "512 K" in size. Each "K" (kilobyte) is 1024 bytes. Each bank of Nvram can be physically implemented with its own memory chip, adding some protection against simple memory chip failures.

An important internal unit in Nvram is the "Block" which contains 64 bytes. Any file or directory will have an integral number of such Blocks. Their "Block Number", sometimes called a "Block offset", within its bank, identifies the Blocks. The numbering convention for all memory-related concerns begins at '0'. Thus, the two (2) Nvram banks are numbered '0' and '1' and the third Block in a bank would be called "Block 2".

Figure 6:
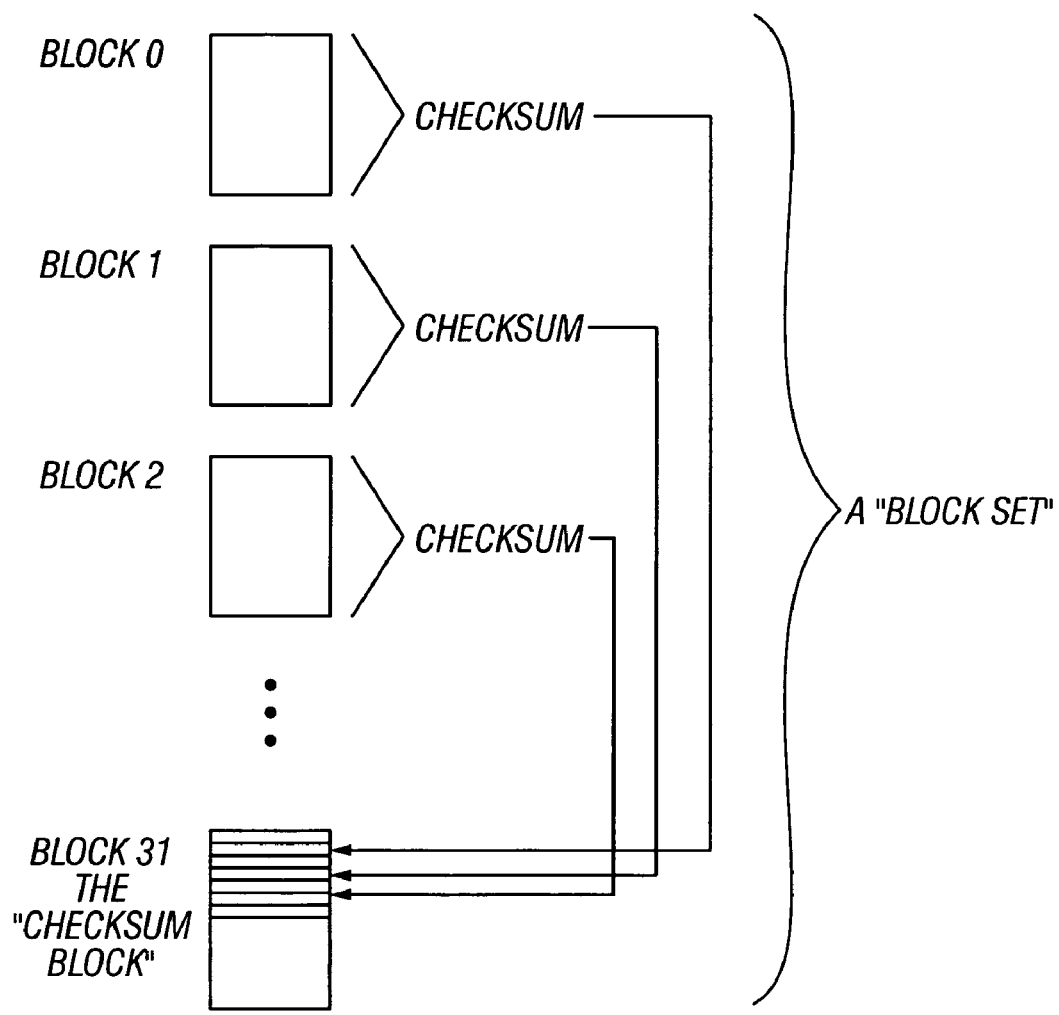
FIG. 6 is a simplified block diagram illustrating the concept of a "Block Set" according to an exemplary aspect of the present invention.

Another important unit in the Nvram design is the "Block Set". FIG. 6 is a simplified diagram illustrating the concept of the "Block Set" according to an exemplary aspect of the present invention. Each set of 32 contiguous blocks, starting at block 0, forms a "Block Set". The last block in such a set contains 32 2-byte checksums, each corresponding to one of the blocks within that Block Set. Thus, when the first block of a Block Set is (re)written, its checksum is calculated and stored in the first two bytes of block devoted to the checksums for that Block Set. When the second block of that Block Set is changed, its checksum is recalculated and stored in the second 2-byte area of the same checksum block. The checksum block itself theoretically has a pair of bytes allocated for its checksum but Nvram software does not checksum the checksum block. Adding all the bytes within a block forms a checksum. It is stored and compared as a 2-byte value.

File System Structures

The "Block Set" and checksum structure, previously described, is at a more fundamental level than the file system. A "free block" in the following will mean one of the 31 blocks of each Block Set which is not charged with storing checksums.

The file system type chosen for this example has immutable assignments for the first 3 blocks of each bank. Block 0 is traditionally the "boot block" of any file system. Since our example does not boot from this file system, the contents of this block are undefined. Block 1 is traditionally the "super block" which contains an identifier, called "Magic", which identifies the file system and two (2) other entries describing the free space (the blocks not yet assigned to files or directories). The free space will be described later but the super block entries are: "Magic" which contains the letters "NVFS", "Free" which contains the Block Number of the free list, and "freeCount" which represents the number of free Blocks. Block 2 is the start of the directory for the "root" file system ("/" in Unix parlance). Starting at Block 2, every (non checksum-related) block in Nvram is in a file, a directory, or is free space, available for use in a later file or directory.

Structure of a File

Figure 7:
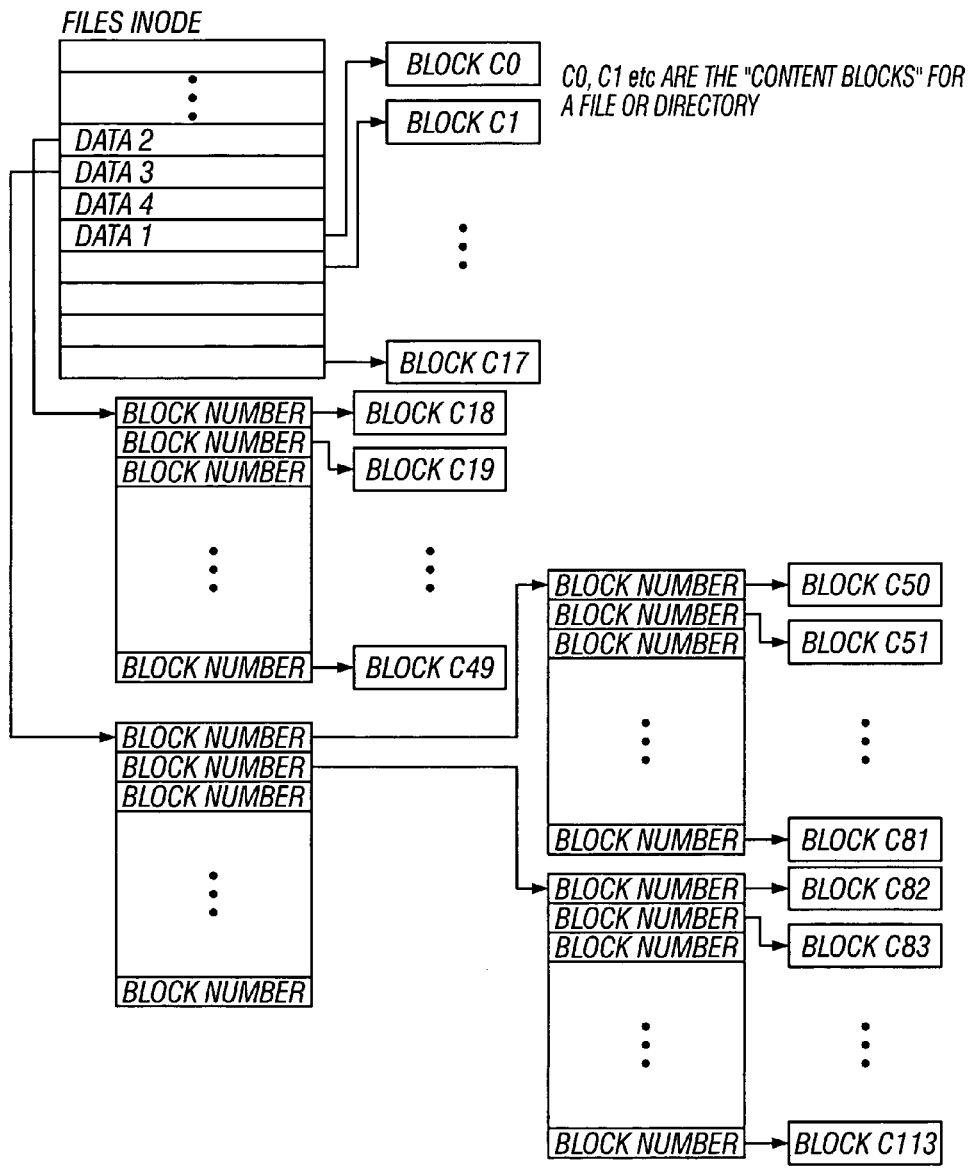
FIG. 7 is a simplified block diagram illustrating a file structure according to one exemplary aspect of the present invention.

A file starts with a very special block containing all its critical information. This special block's "Block Number" is measured relative to the start of its bank and is given several names: the file's "location", the file's "Inode", and the file's "first block". FIG. 7 is a simplified block diagram illustrating a file structure according to one exemplary aspect of the present invention. The table below illustrates the file contents.

| Offset | # of bytes | Name | Description |
|---|---|---|---|
| 0 | 2 | Type | File's type |
| 2 | 2 | Mode | File's mode |
| 4 | 2 | Uid | User ID. Always 0. |
| 6 | 2 | Gid | Group ID. Always 0. |
| 8 | 4 | cTime | Time of file creation |
| 12 | 4 | mTime | Time of last modification |
| 16 | 4 | Size | Number of bytes in file |
| 20 | 2 | blockCount | Number of Blocks assigned to file |
| 22 | 2 | Data2 | Block Number. See text and diagrams |
| 24 | 2 | Data3 | Block Number. See text and diagrams |
| 26 | 2 | Data4 | Block Number. See text and diagrams |
| 28 | 36 | Data1 | A list of 18 Block Numbers. See text. |

Type—the file types are defined in file nvram.h, with terms beginning with the string "NVRAM_TYPE_". The useful ones are: '0' means it is unused; '1' means the file is a directory; '2' means the file is a regular file; '3' means the file is a (symbolic) link to another file.

Mode—a number, composed of bits, which define the Read/Write/Execute properties of the file for the file's owner, the owner's group, and everyone else. See the Unix manual page for "chmod". This typically has a value of 666 (octal. In hex this is 1D6).

Times are given in the number of seconds elapsed since Jan. 1, 1970.

Data 1,2,3,4 entries contain the Block Numbers for the file's contents. Data1 is at "1 level of indirection, Data2 at 2 levels, and so on. The meaning of "indirection" is best defined in the following diagrams.

Data1's first 2 bytes are the Inode number of the Block containing the 1st 64 bytes of the file. Data1's 2nd 2 bytes are the Inode for the file's 2nd 64 bytes and so on through the end of Data1. Having Block Numbers referring to contents, rather than the contents themselves, is called "indirection" (1 level).

Data2 has the Block Number of a block that contains 32 Block Numbers of file contents. This is said to be 2 levels of indirection.

Data3 has the Block Number of a block containing 32 Block Numbers. Each of those blocks contains 32 Block Numbers identifying file content.

Data4 uses the same scheme, but with one additional level of indirection.

Files rarely require all the above levels. Data1 can completely describe the content locations for files up to 18*64 (1152) bytes in length. Data1 and Data2 can describe files up to 18*64+32*64 (3200) bytes in length.

Directory Structure

A directory is simply a file with special contents. Each entry is a fixed length and describes a single file; the entries are stored "end-to-end". An entry has just two components, an Inode and the file's name. The Inode or, more properly, the "Inode Number" for a file is the Block Number of the Inode structure shown above. The file's name is a sequence of Ascii characters terminated with a zero byte; thus, the file's name can be up to 61 bytes in length (64 byte block–2 byte Inode Number–1 byte for terminator=61).

Free Space

The free space list is rooted in the super block whose 'free' entry points to an Inode which contains the Data1, Data2, Data3, and Data4 values for a "file" whose blocks are taken whenever a real file needs blocks.

Links

Note that two different directory entries are able to identify the same Inode. This is called a "link" or, sometimes a "hard link". The hard linked files have contents within the Nvram system and are thus protected by the Nvram checksums and redundancy.

Identifying Data Sets

At a higher level than the file system, the software defines two (2) ways of storing information, called "NV1 objects" and "NV2 objects". When a program writes a 100 byte NV1 object, the result is a file of 100 data bytes. When a program writes a 100 byte NV2 object, the result is a file of 200 data bytes; there are 2 copies of the image in the file. This redundancy, coupled with the bank 0/1 redundancy means there are 4 copies of the NV2 information. In a file made by NV2 techniques, the second 100 bytes of the example would immediately follow the first 100 bytes; that is, the images are stored "end-to-end". For someone examining the contents of Nvram, it is important to know whether the file in question is of type NV1 or NV2. The NV2 object contains a header of 24 bytes, followed by the first copy of the data, followed by the second copy of the data. In one implementation, the NV2 object header is declared as follows:

```
struct Hdr // Header structure at beginning of file.
{           // Data follows the Hdr.
    unsigned char state; // State of data.
    unsigned char reserved;
    unsigned long size1; // Size of data chunk1.
    unsigned long size2; // Size of data chunk2.
    unsigned long offset2; // Offset oData for chunk2.
    unsigned long chksum1; // Checksum of data1
    unsigned long chksum2; // Checksum of data2
}
```

The system of the present invention utilizes the following design strategy in providing power hit tolerance. Divide the process of saving the data (records and/or file) into steps or stages, called "states". Make and store a variable, typically called a "state variable", which identifies the processing step or state at any time. If power is interrupted, and this state variable is also stored in a recoverable manner, then the recovery software knows what condition (state) the file and record data is in. Knowing this, the recovery software can apply state-dependent algorithms to reconstruct the data, records and file. Implicit in this is that the states is chosen such that there is a recovery algorithm for each possible state.

The use of states, as described above, makes this approach a "state-machine" and it allows the design to work even when power is being quickly removed and re-applied. If, on one short-lived powerup, only a partial recovery is made, then the state variable will only reflect the amount of recovery progress made.

The design also has to watch for catastrophic failure, where the NV storage no longer works, perhaps as a result of a power spike.

The following is terminology used herein:
1: refers to the 1$^{st}$ of 2 redundant data areas, for the file or record in question.
2: refers to the 2$^{nd}$ of 2 redundant data areas, for the file or record in question.
Checksum: a number, formed by adding all of a set of data together, used to detect if data is corrupt.
CRC: Cyclic Redundancy Check. a number, formed by computing an equation for all of a set of data, used to detect if data is corrupt.
Data Set: an aggregation of data to be written to NV storage
Error Detection Number: can be a checksum, CRC
Header: anciliary information about a file or record that is also stored in nvram. It contains copies of the state variable and checksum.
Nv storage: "Non-volatile storage"
State Names and Definitions The state variable can take on any of the possible meanings, which are generally represented by numbers, not names, in a typical implementation. These names though will make the following exposition easier to understand.
Copy1to2: power went out while an earlier recovery was in progress; one section of the redundant copies was (is) being copied to the other.
Copy2to1: power went out while an earlier recovery was in progress; one section of the redundant copies was (is) being copied to the other.
idle: save2 had been completed when power interrupted
new1: the most recent data written in Save1 went to the 1$^{st}$ area.
new2: the most recent data written in Save1 went to the 2$^{nd}$ area.
updating1: the 1st of two redundant copies of data are being written to NV storage.
updating2: the second of two redundant copies of the Data Set are being written to NV storage. If the recovery algorithm finds the state variable equals 'updating2', it knows it can use the 1$^{st}$ of the 2 redundant copies as valid data.

Low-Level Procedures Referenced in the Flowcharts

SetState(state number) is a procedure that writes "state number" so that the recovery procedure is assured of reading a valid state value.

Algorithm for Saving Data

For the purpose of describing the algorithms, the write process begins when a program requests that a data record (or file) be written. The following is the pseudo code:

```
Save1{
    Set PowerhitFlag to NotHit
    Calculate Error Detection Number for the data to be written.
    If the record or file is not increasing in size
        SetState(updating1)
        Store header (and checksum) in data area 1
        Store the data in data area 1
        If caller wants to use Save1 and Save2 as an indivisible pair
            Only keep a local copy of state 'new1'
        Otherwise record the state in NV storage.
            SetState(new1)
    Otherwise if the record or file is increasing in size
        SetState(updating2)
        Store header (and checksum) in data area 2
        Store the data in data area 2
        If caller wants to use Save1 and Save2 as an indivisible pair
            Only keep a local copy of state 'new2'
        Otherwise record the state in NV storage.
            SetState(new2)
}
Save2{
    If state is new2
        SetState(copy2to1)
        Copy area 2 to area 1 on the NV storage
        SetState(Idle);
    If state is new1
        SetState(copy1to2)
        Copy area 1 to area 2 on the NV storage
        SetState(Idle);
    If PowerhitFlag equals Hit
        Run recovery algorithm (below)
}
```

Algorithm for Recovering Data

The recovery algorithm can be run at any point after the system has been re-powered and recovered basic functionality. This implementation embedded the recovery in the file Open routine so that the client software using the design did not have to control the recovery process. From the client software's standpoint, the computer starts up and provides files, as always, as though no power interruption occurred. Internally, however, the Open routine looked for and fixed any corruptions before the client software was able to use the data. Shown below is the pseudo code representing the salient parts of the recovery process.

```
Recover {
    read header from NV storage (checksum and state variable)
    read the redundant copies of data from NV storage.
    if header contains 'impossible values', declare catastrophic failure
        (no recovery is possible)
    if state was Idle
```

-continued

```
        calculate checksums for each copy of data
        compare the calculated checksums to those retrieved from
NV storage.
        If both data areas are bad, declare catastrophic failure
        (no recovery is possible)
        If only one data area is bad, copy the good one over the bad
        and return it to
            NV storage.
        If neither data area is bad and the 2 copies are identical,
        return it to the
            calling software as 'good'
        If neither data area is bad but the 2 copies are not identical,
        copy #1 over #2 in
            NV storage and return it to the calling software as 'good'.
    if state was updating 1 or copy2to1
        SetState(copy2to1)
        read the 2nd of 2 redundant copies from NV storage
        write that data to the 1st of the 2 redundant areas.
        SetState(Idle)
    if state was updating2 or copy1to2
        SetState(copy1to2)
        read the 1st of 2 redundant copies from NV storage
        write that data to the 2nd of the 2 redundant areas.
        SetState(Idle)
    if state was new1 or new2
        calculate checksums for each copy of data
        compare the calculated checksums to those retrieved from
NV storage.
        If both data areas are bad, declare catastrophic failure
        (no recovery is possible)
        If state is new1
            Return the 2nd area to the caller
        Otherwise
            Return the 1st area to the caller
        SetState(Idle)
    Unless an error was reported earlier in this routine,
    return requested data to caller.
}
```

Methods for Using NVRAM Modules

Non-volatile memory, novram or nvram, is required for maintaining critical data in gaming machines such as credits, meters, data logs, last game played, . . . etc. The following describes the novram library and how the game developer can use it to store critical data.

Architecture

In one implementation, Novram in the present invention is accomplished using a Dallas battery backed memory located on the personality I/O board. A special Linux device driver has been written to make the battery-backed memory appear as an ordinary file system. Startup scripts mount this file system under the directory /nvram. Any files or directories created under /nvram/* are stored in battery backed memory. Making novram appear as a normal file system makes it convenient for the developer to interrogate and maintain the contents with standard Linux tools without necessitating new proprietary tools to manipulate novram structures.

Writing to a battery-backed file alone does not insure power-hit tolerant code. Therefore, the system of the present invention uses a series of C++ classes to provide a set of rules and structure to facilitate power-hit tolerant code.

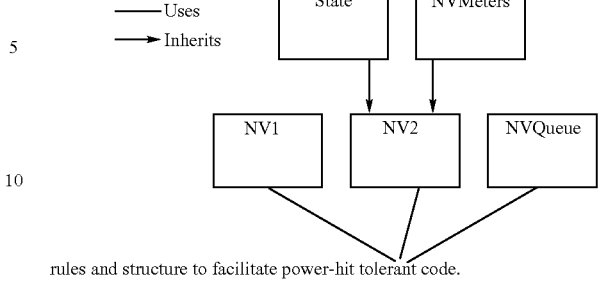

Figure 8:
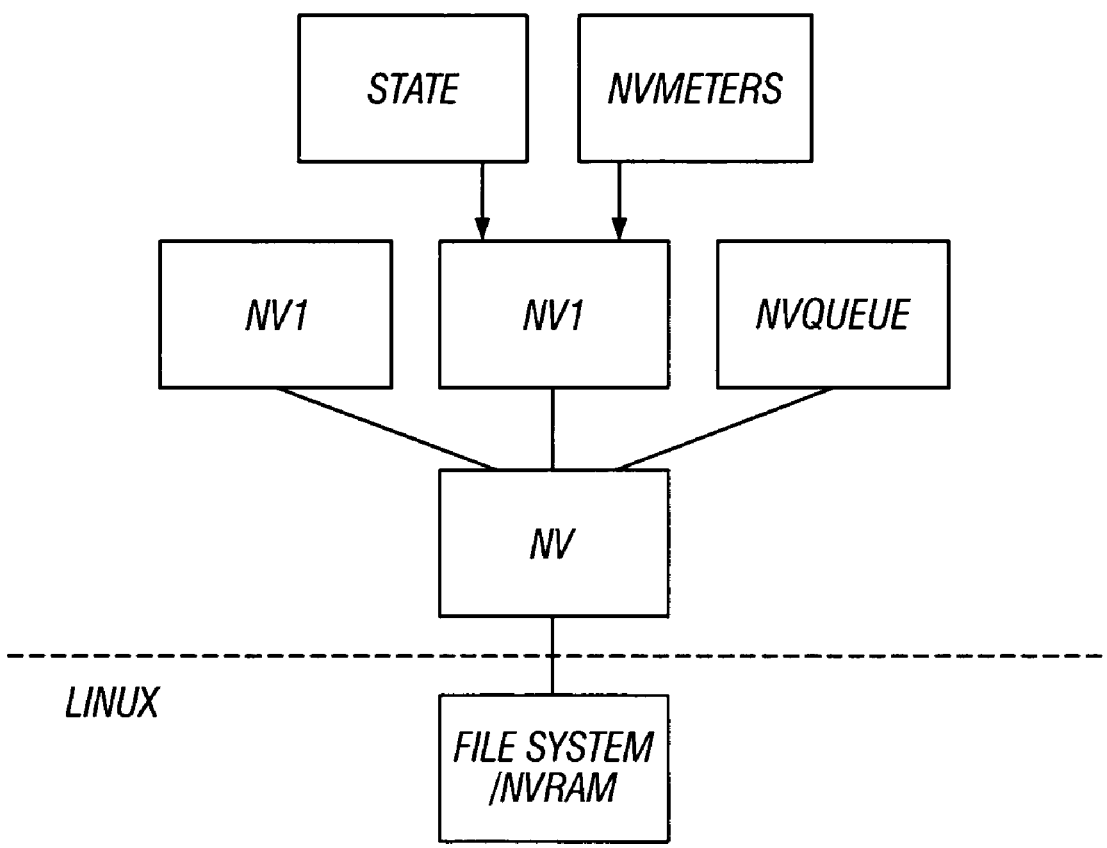
FIG. 8 is a simplified block diagram illustrating the non-volatile class hierarchy according to one exemplary aspect of the present invention.

FIG. 8 is a simplified block diagram illustrating the non-volatile class hierarchy according to one exemplary aspect of the present invention. Description of the hierarchy is as follows:

| | |
|---|---|
| NV | This class manages novram files. All novram objects use the NV base class for handling basic file I/O. This class isolates the implementation of files to access novram. |
| NV1 | This class manages novram data structures stored in files. Data in this file is only stored once. Saving the contents of this file will insure recovery after a power hit, unless the power hit occurred in the middle of saving the contents. Use this object if you don't care about power hits during the middle of saving, but want to insure that once saved successfully, the contents will be recovered after power hits. |
| NV2 | Similar to NV1, this object stores data structures in files. However, two copies are stored. One copy is always valid, even if a power hit occurs in the middle of saving the contents. This is the most predictable and secure type of novram. This object is used most commonly to support updates to novram data based on state transition flows. |
| NVQueue | This object facilitates saving a novram queue of elements of your choosing. For example, a queue of last game played data structures. |
| NVMeters | This object is used for storing and updating game play and statistical meters. It is based on the NV2 object but allows data elements in the NV2 object to be Meter objects. |
| State | This object is a non-volatile state transition variable. It records the current state for a state machine. It is very powerful in that it also can save many sub states for each state. |

Note:
One of the errata with the existing novram file subsystem is that changing the size of files can result in a very small non power-hit tolerant window. This is more of a limitation of the ext2 file system that buffers in RAM new file nodes allocated and does not immediately flush them to disk, even though the file data is immediately written to the disk, making the file seem shorter than it should be if a power hit occurred within this window.
Until this issue is resolved, files should remain fixed in size once created, and changing their size should only be done in rare circumstances understanding that a power hit in the middle of this operation might result in loss of data.

NV Class

The NV class provides convenience routines for opening novram files, writing to files, reading, setting the size of files, and other utility functions. Even though the novram system is based upon standard Unix files under the /nvram/* directory, the purpose of this class is to isolate all other objects from this. If down the road, Unix files are no longer used to store novram data, then only this class will change and all other objects that use NV can remain the same. Also, there are various details in dealing with the novram file system that are hidden by the NV class. In one implementation, the class structure is as follows:

```
class NV
{
public:
    // Construct a new NV object. Does not open the file.
    NV ( );
    // Destructor. Closes the file if open.
    virtual ~NV ( );
    // Open the file for I/O. Get the existing fileSize prior to opening.
    virtual void Open (const char * fileName);
    // Close the file.
    virtual void Close ( );
    // Set the size of the file. Any bytes added are 0'd.
    virtual void SetSize (unsigned long size);
    // Get the size of the file as set by SetSize.
    virtual unsigned long Size ( );
    // Clear the file and all data. Must have previously set the size.
    virtual void Clear ( );
    // Write a file data segment.
    virtual void Write (unsigned long offset,
                        const void * buf,
                        unsigned long length);
    // Read file data into ram.
    virtual void Read (unsigned    long offset,
                       void *      buf,
                       unsigned long length);
    // Check for existence of file.
    static bool FileExists (const char * fileName);
    // Get size of file. Returns -1 if file does not exist.
    static unsigned long FileSize (const char * fileName);
    // Delete the file. File must exist.
    static void DeleteFile (const char * fileName);
    // Utility routine to perform a checksum over data.
    static unsigned long Checksum (const void * data, unsigned long len);
public:
    int      fd;         // File descriptor of open file. -1 = not open.
    char *   name;       // Name of the open file.
    unsigned long fileSize;  // Size of the file.
};
```

NV1 Class

This class manages novram data structures stored in files. Data in this file is only stored once. Saving the contents of this file will insure recovery after a power hit, unless the power hit occurred in the middle of saving the contents, in which all data would be lost. This object is used if it does not matter that power hits occur during the middle of saving, but data is to be stored for recovery from novram and use at some later time. To use the NV1 class put the following line in a c++ file:

include "NV1.h"

In one implementation, the NV1 class has the following definition:

```
class NV1
{
public:
    // Construct a NV1 object.
    NV1 ( );
    // Construct an NV1 object giving ptrs to functions to call for I/O.
    // Use this if you don't want to create a class and override the
    // ReadData and WriteData functions.
    NV1 (void (*read) (Stream &s), void (*write) (Stream & s));
    // Destruct the object. Close file if open. Does not save.
    virtual ~NV1 ( );
    // Load file data into ram. Recover previous data. Calls ReadData( )
    // which must be overridden. If file does not exist, then it will be
    // created by calling WriteData which must be overridden.
    // If a partial update was previously performed, the file will be
    // cleared.
    virtual void Open (const char * filename);
    // Close the file if open. Does not save.
    virtual void Close ( );
    // Store all data back to the file.
    virtual void Save( );
protected:
    // Read user data from the stream into user data storage.
    virtual void ReadData(Stream & s);
    // Write user data storage to the stream for storage into novram.
    // Override this routine so you can write to the stream any amount of
    // data you want to store. The file size is automatically adjusted to the
    // amount of data you write.
    virtual void WriteData (Stream & s);
};
template<class Type> class NV1Type : public NV1, public Type
{
public:
    // Construct the template object.
    NV1Type ( )
        { memset((Type*)this, 0, sizeof(Type)); }
protected:
    // Read the objects data.
    virtual void ReadData(Stream & s)
        { s.Read((Type*)this, sizeof (Type)); }
    // Write the objects data to novram.
    virtual void WriteData (Stream & s)
        { s.Write((Type*)this, sizeof (Type)); }
};
```

The easiest and most common way to use NV1 class is to use the template NV1Type that allows any data structure to be made non-volatile. The following example shows how to declare a data structure type and then make it non-volatile. This standard template method is used similarly throughout the system of the present invention.

```
#include "NV1.h"
// First declare a structure of data to keep in novram.
// The only limitation is that the structure can not contain pointers to other
// structures or objects. However, it may contain other structures.
struct Data
{
    int a, b;
    char name[20];
//char * text; // A declaration like this would be bad.
};
// Next declare my novram data typedef.
typedef NV1Type<Data> NVData;
// Now declare a novram variable of this new type.
NVData nvData;
void main ( )
{
    // Open and recover the previous novram data. If it's the first
    time opening
    // the file, e.g. the file did not exist, then the structure will be all 0's.
    nvData.Open("/nvram/my-critical-data";)
    // Modify some data in the object. This only modifies the ram value
    in memory.
    nvData.a += 1;
    nvData.b = nvData.a * 2;
    strcpy(nvData.name, "Testing");
    // Now save the ram values in the object to the file.
    nvData.Save( ); // A power hit in the middle of this will lose all data.
    // Close the file only when there are no more changes to save.
    // The memory contents will remain. This is optional and almost
    never done
```

```
        // in practice. Mostly novram objects are kept open until destructed.
        nvData.Close ( );
}
```

Example 1: Using NV1 Template class
Note:
One of the standard things that can help readers of your code readily identify which structures typedefs are Nonvolatile objects is if they are prefixed with NV such as NVData in the previous example
Also, declaring variables with the nv prefix such as nvData helps the reader identify that it is a novram variable and a Save( ) needs to be performed for that variable type when it is modified. Separating your novram variables from your volatile variables is important for clear and maintainable code.

Another way to use the NV1 class is to inherit it and override the ReadData and WriteData virtual functions to restore and save data respectively. In fact, that is exactly what the template class NV1Type does. Sometimes overriding these functions can give more flexibility if the format of the data being saved is more dynamic than a static structure declaration. If the NV1 class is to be used directly but inheritance is inconvenient, then the read and write function pointers can be passed to NV1 when the basic object is constructed. When it is time to recover and save data, the appropriate functions will be called.

NV2 Class

Similar to NV1, this object stores data structures in files. However, two copies are stored. One copy is always valid, even if a power hit occurs in the middle of saving the contents. This is the most predictable and secure type of novram object. One of the benefits of a NV2 object is that when Save( ) is called, it is an atomic operation. Either the update from RAM to battery-backed data will be performed in full or will not be performed at all if a power hit occurs in the middle of Save( ), Save1( ), or Save2( ).

```
class NV2
{
public:
    // Constructor.
    NV2 ( );
    // Construct an NV2 object giving ptrs to functions to call for I/O.
    // Use this if you don't want to create a class and override functions.
    NV2 (void (*read) (Stream &s), void (*write) (Stream & s));
    // Destruct the object. Close file if open. Does not save.
    virtual ~NV2 ( );
    // Load file data into ram. Recover previous data. Calls ReadData( )
    // which must be overridden. If file does not exist, then it will be
    // created by calling WriteData which must be overriden. Any partial
    // updates to the secondary copy are replaced by the primary copy.
    // Any partial updates from the secondary copy to the primary
    copy will
    // be completed upon recovery.
    virtual void Open (const char * filename);
    // Close the file if open. Does not save.
    virtual void Close ( );
    // Calls Save1 and then Save2. Not really power hit tolerant
    unless you
    // don't care whether the data gets updated fully or not at all
    without really
    // knowing which happened after recovery. Use states with Save1
    & Save2 if
    // you really need better control over the update.
    virtual void Save ( );
    // First step to updating. Calls WriteData to get the new data and
    writes
    // it to the secondary copy of novram.
    virtual void Save1 ( );
    // Last step to updating. Copies secondary copy of novram to
    primary copy.
    virtual void Save2 ( );
    // Validate the data in the novram file
    virtual void Validate ( );
protected:
    // Read user data from the stream into user data storage.
    virtual void ReadData(Stream & s);
    // Write user data storage to the stream for storage into novram.
    virtual void WriteData (Stream & s);
};
```

The functions are almost identical to NV1 except the implementation stores two copies of the data. Two new functions Save1( ) and Save2( ) are added which allow the user to independently save each copy of novram data. Sometimes Save1( ) is called to save the changes in the backup copy of the data but the final commitment of data is not performed until Save2( ) is called. NV2 also has a template class that makes it easy to create novram objects.

```
template<class Type>
class NV2Type : public NV2, public Type
{
public:
    // Construct the template object.
    NV2Type ( )
        { memset((Type*)this, 0, sizeof (Type)); }
protected:
    // Read the objects data.
    virtual void ReadData(Stream & s)
        { s.Read((Type*)this, sizeof (Type)); }
    // Write the objects data to novram.
    virtual void WriteData (Stream & s)
        { s.Write((Type*)this, sizeof (Type)); }
};
```

The following is a similar example as the NV1 example except that data is doubly stored.

```
#include "NV2.h"
// First declare a structure of data to keep in novram.
// The only limitation is that the structure can not contain pointers to other
// structures or objects. However, it may contain other structures.
struct Data
{
    int a, b;
    char name [20];
//char * text; // A declaration like this would be bad.
};
// Next declare the novram data typedef.
typedef NV2Type<Data> NVData;
// Now declare a novram variable of this type.
NVData nvData;
void main ( )
{
    // Open and recover the previous novram data. If it's the first
    time opening
    // the file, e.g. the file did not exist, then my structure will be
    all 0's.
    nvData.Open ("/nvram/my-critical-data");
    // Modify some data in the object. This only modifies the ram
    value in memory.
    nvData.a = 1;
    nvData.b = 2;
    strcpy(nvData.name, "Testing");
    // Now actually save the ram values in the object to both copies
    in the file.
    nvData.Save( );      // A power hit in the middle of this will
                         either save the
                         // new values to both copies in novram or
                         not change anything.
```

```
        // Close the file only when there are no more changes to save prior
        to program
        // shutdown. The memory contents will remain.
        nvData.Close( );
}
```

Example 2: Using NV2 Template class

Like NV1, the NV2 class can also be used directly when more flexibility is needed. In this case either NV2 is inherited and the ReadData and WriteData functions are overridden; or if inheritance is inconvenient, then use a straight NV2 object passing the pointers to the read and write functions in the constructor. The following example shows how to use the NV2 class to support non-volatile storage of data kept in a singly linked list.

```
#include "NV2.h"
// This is an example data structure kept as an element in a list.
struct Data
{
    int     a, b;         // Some data.
    char    name[20];     // Some more data.
};
// This is single linked list structure declaration.
struct LinkedData : public Data
{
    Data * next;          // Next data structure in the linked list.
};
// List of singly linked Data elements. This is not managed by the
NV2 object.
// Instead it is the application programmers object that is indirectly
controlled
// through the NVReadList( ) and NVWriteList( ) functions.
LinkedData * list;
// Recovers the list data from novram by reading the data from the
stream.
// This is called at the appropriate time by the NV2 object.
void NVReadList (Stream & stream)
{
    // Delete the current linked list. A new list will be created from
    the data
    // in the stream provided by the NV2 object.
    DeleteList(list)
    list = NULL;
    // Check if the stream is empty. This could be the case if the file
    did not
    // previously exist.
    if (stream.FileSize( ) == 0)
        return;
    // Read the number of elements stored previously.
    int totalElements = 0;
    assert (stream.Read (&totalElements, sizeof (totalElements)));
    // For each element. Read the data.
    while (totalElements--)
    {
        LinkedData * data = new LinkedData;
        // Read the structure elements. We only read a Data element
        as that is what
        // was stored by NVWriteList.
        assert (stream.Read (data, sizeof (Data)));
        // Add the data structure to the linked list.
        AddList (list, data);
    }
}
void NVWriteList (Stream & stream)
{
    // First write the total number of elements in the list.
    int totalElements = CountListElements(list);
    // Next write the structure contents of each node.
    LinkedData * data = list;
    while (data)
    {
        // Write the data structure subclass Data.
        assert (stream.Write (data, sizeof(Data)));
        // Go to the next element.
        data = data->next;
    }
}
void main ( )
{
    // Create an NV2 object and use the passed read and write
    functions to read and
    // write the data when appropriate.
    NV2 * nvList = new NV2(NVReadList, NVWriteList);
    // Open and recover the previous novram data. If it's the first
    time opening
    // the file, e.g. the file did not exist, write will be called to initialize
    // the file. Therefore, list should be empty by default.
    After this call,
    // NVReadData may have recovered the list from memory-in any
    event, list will
    // be consistent with the novram data.
    nvList.Open("/nvram/my-critical-data-list");
    // Modify some data in the list. This only modifies the ram values
    in memory.
    RandomlyShuffleTheList (list);
    // Now save the list in RAM to novram.
    nvList.Save( );    // A power hit in the middle of this will
                        either save the
                        // new values to both copies in novram or not
                        change anything.
    // Delete the NV2 object. This does nor affect the RAM list variables.
    delete nvList;
}
```

Example 3: Using NV2 class to store and recover dynamic structures

NVMeters Class

This class is used for storing and updating game play or statistical meters. It is based on the NV2 object where its doubly stored data is an array of Meter objects. This class provides complete power hit tolerance for updating meters when properly used with the State class for state transitions. In one implementation, the NVMeters class is defined as:

```
class NVMeters : public NV2
{
public:
    // Constructor
    NvMeters ( );
    // Destruct the object. Close file if open. Does not save.
    virtual ~NVMeters ( );
    // Load file data into ram. Recovers all meter data. If file does not
    // exist, then it will be created with 0 value meters. If the meter count
    // differs from the file, the file will be updated the next time the file is
    // saved. If meters where in the middle of a Save1( ) but not
    completed, then
    // the operation will be backed out. If in the middle of a Save2( ),
    then
    // the operation will be completed.
    virtual void Open (const char * filename, unsigned int totalMeters);
    // Retrieve a meter value. You can operate on this meter value as
    needed
    // just as if you were indexing into an array of longs. Call Save1( ) to
    // store the new meter values to the secondary storage in the file.
    // Call Save2( ) to finally update the meters. Note that after recovery
    // and before a Save2( ) has been made, all meter values will be
    recovered
    // with their primary(unchanged) values.
    Meter & operator [ ] (unsigned int meterIndex)
    {
        assert (meters);
        assert (meterIndex < totalMeters);
        return meters[meterIndex];
    }
    const Meter & operator [ ] (unsigned int meterIndex) const
    {
```

```
            -continued assert (meters);
        assert (meterIndex < totalMeters);
        return meters[meterIndex];
    }
}
```

To the application programmer, a NVMeters class object appears like an array of long integers. The application programmer can easily use the values by indexing into the array with [ ] and modify their values in a similar manner.

Instead of long integers, however, NVMeters is actually an array of Meter objects. Meter objects are based upon long integers except they enforce rollover values. So adding 1000 to a Meter object may roll it over to a small number if it exceeds its rollover value.

```
class Meter
{
public:
    // Meters rollover at this default value unless otherwise specified.
    // This value is the largest power of 10 that will fit in a long.
    static const unsigned long defaultRollover = 1000000000;
    // Default constructor sets meter value to 0 with defaultRollover.
    Meter ( );
    // Construct from an existing value, and use defaultRollover.
    Meter (long initValue);
    // Construct from an existing value and rollover.
    Meter (long initValue, unsigned long initRollover);
    // Construct by copying another meter's value and rollover.
    Meter (const Meter & meter);
    // Set a new rollover value for the meter. 0 = don't rollover meter.
    // Will immediately modifiy the current meter to lie within rollover value.
    void SetRollover (unsigned long newRollover);
    // Set value and rollover value.
    void SetRollover (long newValue. unsigned long newRollover);
    // Copy another meter's value and rollover.
    Meter & operator = (const Meter & meter);
    // Cast operator. Automatically casts a Meter to a long if used by the
    // programmer in the context of a long.
    operator long ( ) const;
    // Assignment operators modify and return the meter. Result can be used
    // in the context of a long or a Meter. Applies the rollover to new value.
    Meter & operator = (long v);
    Meter & operator += (long v);
    Meter & operator -= (long v);
    Meter & operator %= (long v);
    Meter & operator /= (long v);
    Meter & operator ++ ( );
    Meter & operator -- ( );
};
```

NVQueue Class

The NVQueue class is used to store a queue of non-volatile elements. While the NV2 object can be used to store queue data, it is fairly wasteful for queues of any significant size. While the NV2 object stores two copies of data, the NVQueue object only stores one copy of the queue data. The NVQueue object is also faster at updating specific elements because just the element is written to novram during updates, not the entire queue. The limitation with the NVQueue class is that only one element at a time can be updated and saved to novram as opposed to updating many elements and saving them all at once. In most cases this is desirable.

Just as NV2 objects contain a Save1 ( ) and Save2 ( ) function calls to break up state updates, NVQueue objects contain similar functions for normal queue manipulations. The Add1 ( ) and Add2 ( ) function calls allow the programmer to break up adding an element to the end of the queue by using two state independent transitions. Similarly, Update1 ( ) and Update2 ( ) support modification of a particular element in the queue. And finally, Del1 ( ) and Del2 ( ) provide support for removing the head element from the queue.

```
class NvQueue
{
public:
    // Constructor. The constructor sets the values for these variables for
    // use when a new novram file is created on an Open( ).
    // If file does not exist on the Open( ) call, then it will be created with
    // initially no elements with a maximum # of elements of "maxElements",
    // with each element being fixed in size of "elementSize". wrapAdds will
    // cause any Add( ) calls to purge the old element in the queue to make room
    // for the new element if necessary.
    NVQueue (unsigned int maxElements, unsigned int elementSize,
             bool wrapAdde = true);
    // Destruct the object. Close file if open. Does not complete any operations
    // in progress if you did not finish them. Basically the same as a powerhit.
    virtual ~NVQueue ( );
    // Load file data into ram. Recovers all queue elements from novram.
    // Any partial adds or deletes after a powerhit will be completed at this
    // time. If the file already exists, any inconsistencies between
    // "maxElements", "elementSize", and "wrapAdds", will cause a NVFault.
    virtual void Open(const char * filename);
    // Close the file if open. Does not save. Element data is still accessable
    // but no modifications can be done.
    virtual void Close ( );
    // Retrieve a const ptr to a queue element. This element can not be
    // changed directly. Index of 0 is the first element at the head of the
    // queue, index TotalElements( ) - 1 is the last element in the queue(tail).
    const void * operator [ ] (unsigned int index);
    virtual const void * Get (unsigned int index);
    // Retrieve the total # of elements in the queue. Note: that the queue may
    // be large enough to hold many elements but only the number of elements that
    // have actually been added will be returned.
    virtual unsigned int TotalElements ( );
    // Return true if queue is empty or full.
    virtual bool Empty ( );
    virtual bool Full ( )
    // Each element is identified by a unique sequence number. These functions
    // return the first and last element sequence number in the queue. You can
    // get the last sequence number of an event to quickly determine if new
    // elements have been added to the queue.
    // LastSequenceNumber( ) - FirstSequenceNumber == TotalElements ().
    // NOTE: : Calling these functions if queue is empty will cause assertion.
    virtual unsigned int FirstSequenceNumber ( );
    virtual unsigned int LastSequenceNumber ( );
    // Returns the next sequence number for an element that would be added.
    virtual unsigned int NextSequenceNumber ( );
    // Add a new element to the queue. This will first make room in the queue
```

```
// if neccessary and "wrapAdds" is true. If "wrapAdds" is
false and the
// queue is full, this function does not add the element to the queue.
// Function returns true on successful addition of the element.
// You must first call Add1( ) to prepare to add the element to the
queue,
// and then call Add2( ) to complete the addition. These add calls
must be
// broken up between state transitions of your own making to
prevent duplicate
// elements from being added during powerhit.
virtual bool Add1 (const void * element);
virtual void Add2 ( );
// If you dont care about powerhit tolerance code which prevents
duplicate
// elements from being added to the queue should a powerhit
occur in this
// function call, then you can just call Add( ). Should a powerhit
occur in
// Add( ), it will either not add anything at all or add the element
// completely. Returns true on successful addition of an element.
virtual bool Add(const void * element);
// Update an element in the queue. The element index must be 0 to
// TotalElements( ) -1. These update calls must be broken up
between state
// transitions of your own making to make clean updates during
powerhits.
virtual void Update1 (unsigned int index, const void * element);
virtual void Update2 ( );
// Update an element in the queue in one atomic action. If a
powerhit
// occurs in this function call, the only guarantee is that the element
// did not get updated at all or it was completely updated.
virtual void Update (unsigned int index, const void * element);
// Delete the next element from the head of the queue. Returns true if
// an element is prepared for deletion, and false if the queue is empty.
// Must be followed by a call to Del2( ) using your own state
transitions.
virtual bool Del1 ( );
virtual void Del2 ( );
// Delete the next element from the head of the queue. Returns true if
// an element is successfully deleted. This function either deletes the
// element in its entirety after a powerhit, or may not delete it at all.
// Call Del1( ) and Del2( ) if you need perfect powerhit tolerancy
to he sure
// you delete one and only one element no matter when a powerhit
occurs.
virtual bool Del ( );
// Validate the data in the novram file
virtual void Validate ( );
};
```

To facilitate the ease of use of the NVQueue class, a template is also declared. By using this template with custom structures, a complete NVQueue type for these custom structures can be easily created and used.

```
template<class Type>
class NVQueueType : public NVQueue
{
public:
        // Construct the template object.
        NVQueueType (unsigned int maxElements, bool wrapAdds =
true)
            : NVQueue(maxElements, sizeof(Type), wrapAdds)
            { }
        // Retrieve a const reference to a queue element. This element
can not be
        // changed directly but only used for reference. Index of 0 is the first
        // element at the head of the queue, index TotalElements( ) - 1 is
the last
        // element in the queue (tail).
        const Type & operator [ ] (unsigned int index)
            { return *(const Type*)Get(index); }
        // Same as Add1 for NVQueue but with reference type.
        bool Add1 (const Type & element)
            { return NVQueue: :Add1(&element); }
        // Same as Add for NVQueue but with reference type.
        bool Add (conat Type & element)
            { return NVQueue: :Add(&element); }
        // Same as Update1 for NVQueue but with reference type.
        void Update1 (unsigned int index, const Type & element)
            { NVQueue: :Update1(index, &element); }
        // Same as Update1 for NvQueue but with reference type.
        void Update (unsigned int index, const Type & element)
            { NVQueue: :Update(index, &element); }
};
```

An example of declaring an NVQueue using the template follows.

```
// First declare a typedef structure for elements you want to store.
struct DataElement
{
    int data1, data2, data3;
};
// Next typedef the new type of NVQueue using the template.
typedef NVQueueType<DataElement> NVDataQueue;
void main ( )
{
    // Create a Q with a maximum of 10 elements.
    NVDataQueue * nvDataQueue = new NVDataQueue(10);
    // Open file and recover the queue elements from novram.
    nvDataQueue->Open( "/nvrarn/the-data-queue");
    // Initialize a new element structure.
    DataElement data;
    data.data1 = 1;
    data.data2 = 2;
    data.data3 = 3;
    // Add it to the queue. This is done as an atomic operation, i.e. if
a power
    // hit occurs in the middle of this operation, then the element will
either be
    // added completely or not at all.
    NvDataQueue->Add(data);
    // All done.
    delete nvDataQueue;
}
```

State Class

The state novram class is used to manage state transitions within a program. The state object stores its current value in novram to facilitate power fail recovery. The state class is a concrete class that acts like an integer. States can be assigned integer values and they can be compared to other integers, enumerations or preprocessor defines. When an integer is assigned to a state variable, the state object immediately stores its new value into novram as an atomic operation. That is, if a power fail occurs during the middle of a state variable update, then the update operation is guaranteed to either complete or not change at all. This automatic operation is different than the other novram objects in that the save ( ) function is not required to be called explicitly. This prevents accidental forgotten updates by the application programmer. In one implementation, the State class definition follows.

```
class State
{
public:
    // Construct a state object which can do nothing until opened.
    State ( );
    // Construct a state object by copying from another. Clones the
    state but
    // does not create any substates or change the current state.
    State (coast State & theState);
    // Destruct our state object. If its the last state object reference to the
    // state file that is opened, then the file will be closed. File will
    // remain open if other states reference the file.
    ~State ( )
    // Open the nv file and recover all state information. This state will
    // point to the top most state in the nv state stack.
    Calling Open() with
    // an already open state will be like destroying the old state object and
    // creating a new object opening this new file or the same file.
    void Open (const char * file);
    // Returns the current state value for the substate this object
    references
    // within the nv state stack. States automatically convert to ints
    so they
    // can be used like integer variables.
    operator int( ) const;
    // Copy the current state to another. Does not change any state info.
    State & operator = (const State & theState);
    // Set this state's current value. This will change the current state
    value
    // for this states position in the nv state stack and will also
    destroy any
    // substates farther down the stack. Changing a state higher up
    the stack
    // essentially destroyes or transitions out of substates.
    int operator = (int newState);
    // Create a substate by pushing onto the stack a new state value
    of zero.
    // This returns a new state varible which references the new
    substack within
    // the nv state stack. Use this new state returned to use and
    change the
    // substate you have created.
    State NewSubState ( ) coast;
};
```

State variables can be declared anywhere in the code where normal variables are declared. When initially created, state variables are not associated with novram files. To be associated with files a state variable must Open ( ) a file. Upon initial creation of the state novram file, the state variable will be initialized to zero. The following examples show various ways a state variable can be declared and recovered.

```
State state;
void main ( )
{
    state.Open("/nvram/state");
    switch (state)
    {
        . . .
    }
}
```

States can also be created.

```
void main ( )
{
    State * state = new State;
    State->Open("/nvram/state");
    switch (*state)
    {
        . . .
    }
}
```

States classes are actually references to novram file objects that contain the states value. Therefore, when a state is copied to another state, both state variables reference the same novram file. Any modification to one state variable will also change the other state variables value and the underlying value in novram. Therefore, when a states can be passed as function arguments.

```
void main ( )
{
    State state, stateCopy;
    state.Open("/nvram/state");
    state = 5;
    printf("state = %d\n", (int)state);
    stateCopy = state;
    stateCopy = 10;
    printf("state = %d\n", (int)state);
    printf("stateCopy = %d\n", (int)stateCopy);
}
```

This program will produce the following output:

```
state = 5
state = 10
stateCopy = 10
```

The following program shows how a state variable can be used to increment a non-volatile meter.

```
void main ( )
{
    // This is the programs main state variable and novram meter variable.
    State state;
    NVMeter meters;
    #define TOTAL_METERS 10
    // Declare some state possibilities.
    enum
    {
        stateInit,
        stateIncrement1,
        stateIncrement2,
        stateEnd,
    };
    // Open the file and recover the previous state.
    state.Open("/nvram/state");
    // Open the meter object to recover the last meter saved.
    meters. Open("/nvram/meters", TOTAL_METERS);
    // Determine what we were doing before the powerfail.
    switch (state)
    {
        case stateInit:
            // Novram cleared powerup. State value is zero,
            meters are zero.
            state = stateIncrement1;
        case stateIncrement1:
            // Increment the meter and perform the first meter update.
            meters[0] += 1;
            meters.Save1( );
            state = stateIncrement2;
        case stateIncrement2:
```

```
            // Complete the meter update.
            meters.Save2( );
            state = stateEnd;
        case stateEnd:
            // Print our meter value.
            printf("Meter[0] = %d\n", (int) meter[0]);
        }
    }
}
```

This example will increment the meter value only once. Once run after a novram clear state, the meter value will change from zero to one. Subsequent runs will still yield a meter value of one because the state will continue to remain at stateEnd.

Often when programming state machines, it is cumbersome to keep one complete table of all possible states of the program. A proper power hit tolerant program may contain hundreds of possible states. Keeping these in one table is difficult to maintain and precludes information hiding. Likewise, the programmer may want to simply call a function to perform a major task without knowing the details of the state transitions required to perform the task. It might seem obvious to simply create a new state variable within the function to keep track of that functions local states. This will frequently cause problems as demonstrated in the following example.

```
// Define meter table and defines for each meter value.
NVMeter meters;
#define METER_CREDITS 0   // Current credit value.
#define METER_PAYOUT 1    //Total win amount to add to credits.
#define TOTAL_METERS 2
void Payout (int winAmount)
{
    // This is our functions local state variable.
    State state;
    // Declare some state possibilities.
    enum
    {
        stateInit,
        stateIncrement1,
        stateIncrement2,
        stateEnd,
    };
    // Open the file and recover the previous state.
    state.Open("/nvram/payout-state");
    // Loop forever until stateEnd exits.
    for (; ;)
    switch (state)
    {
        case stateInit:
            // Don't do anything for zero payouts.
            if (winAmount <= 0)
                return;
            // Save our total amount to payout.
            meters[METER_PAYOUT] = winAmount;
            meters.Save( );
            state = stateIncrement1;
        case stateIncrement1:
            // Increment the credit meter and decrement the
            payout meter.
            meters[METER_CREDITS] += 1;
            meters[METER_WIN] -= 1;
            meters.Save1( );
            state = stateIncrement2;
        case stateIncrement2:
            // Complete the meter update.
            meters.Save2( );
            if (meters[METER_PAYOUT] > 0)
                state = stateIncrement1;
            else
                state = stateEnd;
            break;
        case stateEnd:
            // Set meter back to init for next call and exit the
            function.
            state = stateInit;     // ← Powerhit window exists here.
            return;
    }
}
void maim ( )
{
    // This is the programs main state variable.
    State state;
    // Declare some state possibilities.
    enum
    {
        stateInit,
        stateIncrement1,
        stateIncrement2,
        stateEnd,
    };
    // Open the file and recover the previous state.
    state.Open("/nvram/state");
    // Open the meter object to recover the last meter saved.
    meters.Open("/nvram/meters", TOTAL_METERS);
    // Determine what we were doing before the powerfail.
    switch (state)
    {
        case stateInit:
            // Novram cleared powerup. State value is zero,
            meters are zero.
            Payout (100);
            state = stateEnd;
        case stateEnd:
            // Print our meter value.
            printf("credits = %d\n", (int)
            meter[METER_CREDITS]);
    }
}
```

When this program is run from a novram-cleared state, this program will add 100 credits to a zero credit meter and produce the result.

credits=100

Subsequent runs will continue to keep the credit meter at 100. Any power hit in the Payout ( ) function while incrementing the credit meter will continue where it was left off resulting in a credit meter value of 100. However, this program is not entirely power hit tolerant. If a power hit occurs after the payout is performed, and the payout-state novram variable is set to stateInit, and before the programs main state is set to stateEnd, then the credit meter will be incremented twice to get a value of 200.

One method to make this program power hit tolerant is to store the win amount in a global novram variable prior to calling Payout ( ). The problem with this solution is it causes all major functions which require substate transitions to know about global variables that are used as parameters. Likewise, the calling function must know and store the global power hit tolerant variables that the subordinate function requires. This creates unmodular code.

To solve this, the state novram object provides the concept of substates. Novram state variables contain a main state where each state value contains many substates where each substate value can contain many other substates. A total depth of 25 nested states is supported.

A subordinate function can create a substate from a state variable. Creation of a substate creates a new State variable object from an existing State variable object. The new substate variable object can be used as a normal State variable is used. Likewise other subordinate functions can also create substates from the substates to achieve a modular design. This feature allows state values to be localized to the modules or functions that need to know about the states at that particular level. Whatever substates subordinate functions require is determined by those functions and is not required to be known by the calling function. This makes it very easy to add new state flows for new functionality without maintaining a global state table, thus producing modular code.

The following diagram shows how state flow might be organized in a game program, where each function call indicated by the arrow creates a substate level to perform power hit tolerance functionality.

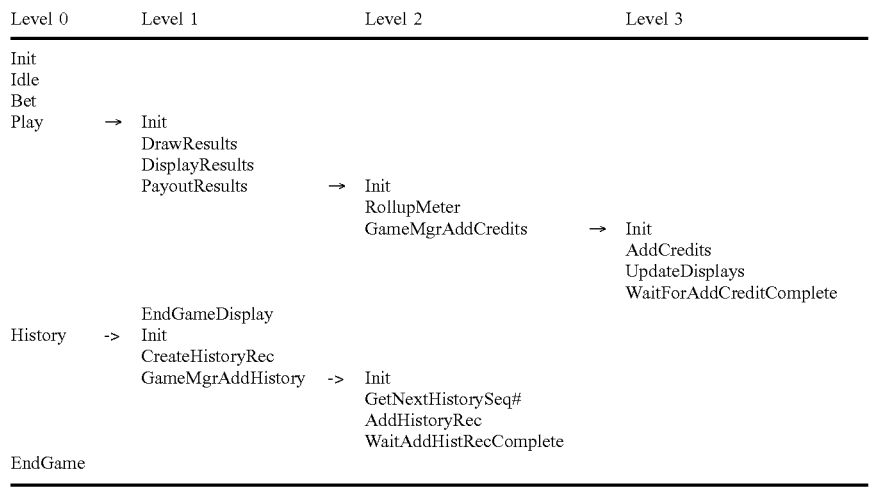

Substates have one rule that accomplishes this power-hit tolerance. When a state value is modified, all of its previous substates are reset to zero automatically. Therefore, if a state value at level 1 is changed from PayoutResults to EndGameDisplay, then substates at Level 2, 3 and above are cleared to zero. That is, changing a states value automatically resets the substates to the init state to prepare for the next time the function is called. It is important for the substates to be reset to the init state only when the higher level state is moved to the next state value. The novram State class provides this support as an atomic operation.

The previous flawed example is reworked here to incorporate the substate functionality for a 100% power hit tolerant program with zero windows for error.

```
// Define meter table and defines for each meter value.
NVMeter meters;
#define METER_CREDITS 0 // Current credit value.
#define METER_PAYOUT 1 // Total win amount to add to credits.
#define TOTAL_METERS 2
void Payout (State & parentState, int winAmount)
{
    // This is our functions local state variable.
    State state = parentState.CreateSubState( );
    // Declare some state possibilities.
    enum
    {
        stateInit,
        stateIncrement1,
        stateIncrement2,
    };
```

```
    // Loop forever until stateEnd exits.
    for (; ;)
    switch (state)
    {
        case stateInit:
            // Don't do anything for zero payouts.
            if (winAmount <= 0)
                return;
            // Save our total amount to payout.
            meters[METER_PAYOUT] = winAmount;
            meters.Save( );
            state = stateIncrement1;
        case stateIncrement1:
            // Increment the credit meter and decrement the
            payout meter.
            meters[METER_CREDITS] += 1;
            meters[METER_WIN] -= 1;
            meters.Save1( );
            state = stateIncrement2;
        case stateIncrement2:
            // Complete the meter update.
            meters.Save2( );
            if (meters[METER_PAYOUT] > 0)
                state = stateIncrement1;
            else
                return;
    }
}
void main ( )
{
    // This is the programs main state variable.
    State state;
    // Declare some state possibilities.
    enum
    {
        stateInit,
        stateIncrement1,
        stateIncrement2,
        stateEnd,
    };
    // Open the file and recover the previous state.
    state.Open("/nvram/state");
    // Open the meter object to recover the last meter saved.
    meters.Open("/nvram/meters", TOTAL_METERS);
```

-continued
```
// Determine what we were doing before the powerfail.
switch (state)
{
    case stateInit:
        // Novram cleared powerup. State value is zero, meters
        are zero.
        Payout (state, 100);
        State = stateEnd;
    case stateEnd:
        // Print our meter value.
        printf("credits = %d\n", (int) meter [METER_CREDITS]);
    }
}
```

There are no power-hit windows in the previous program. When the main( ) functions state variable is set to stateEnd, the Payout( ) functions substate variable is reset to stateInit as an atomic operation. If a power fail occurs right before setting the main ( ) state to stateEnd, then the Payout ( ) function will repeat its last state of stateIncrement2 which will do nothing more than it already did previously, which was to finalize the update to the meter table. If a power fail was to occur right after main ( ) set its state to stateEnd, then stateEnd would be recovered and Payout ( ) would never be called.

One rule in substates is to separate each subordinate function that uses substates into separate states in the calling function. Another nice feature of the substate functionality is that states can be passed to the subordinate functions as parameters allowing the functions to not care what parent states exist. The program flow for power fail recovery can remain largely identical to normal program flow. Likewise, because the subordinate functions do not care about the parent state values, they are independent from the calling functions.

Power-Hit Tolerant Programming

Power-hit tolerant code can be achieved in many ways. Many methods of power-hit programming may contain tiny windows where if a power-hit should occur, the program would either lose data or double process a transaction. The NV class objects are all designed to support one basic methodology where there are no power-hit windows present. This section discusses various examples of how the NV class objects can be used to achieve complete power-hit tolerance.

One common theme in the NV class objects is to break the manipulation functions of a novram class into two basic states.

1. Update State.   E.g.   Save1( ),   Add1( ),   Del1( ),
   Update1( ).

2. Commit State.   E.g.   Save1( ),   Add2( ),   Del2( ),
   Update2( ).

To support these state transitions when updating NV objects, the concept of primary data and transaction data is used. Primary data in the NV object is the original data as represented by the non-volatile memory file and in RAM. The programmer can update the primary data in RAM and then call the appropriate function to perform the Update State, e.g. Save1( ). The Update State does not simply save the modified RAM to the primary non-volatile memory with the modification. Instead, the modified RAM is written to the transaction non-volatile memory within the novram file. An example of how a state flow might be structured is show below.

```
void Payout (State & parentState, int winAmount)
{
    enum
    {
        ADD1, ADD2
    };
    State state = parentState.CreateSubstate( );
    switch (state)
    {
        case ADD1:
            meters[CREDITS] +=        // Add the win to credit
                winAmount;             meter in RAM.
            meters.Save1( );          // Save the new meter value
                                       to Novram.
            state = ADD2;             // Transition to the second
                                       state.
        case ADD2:
            meters.Save2( );          // Commit the final changes
                                       to the meters
        }                             // in novram. RAM is
                                       unchanged.
}
```

The previous example shows a Payout utility function that takes a parent state variable and the total win amount to add to the credit meter. As discussed previously, sub-states can be created from a parent state to localize the state transitions required for the function. This function contains two simple states, ADD1 and ADD2. The ADD1 state updates the meter value in ram and then stores that value in the transaction novram memory. The ADD2 state commits the transaction by copying the transaction memory in novram to the primary memory in novram. The second state is always a commit state where modification should never occur and usage of data should not occur before the commit, or Save2 ( ) function is called. The following example shows power-hit tolerance analysis for the code segment.

```
void Payout (State & parentState, int winAmount)
{
    enum
    {
        ADD1, ADD2
    };
    State state = parentState.CreateSubstate( );
    switch (state)
    {
        case ADD1:
            // ←--------------------  A power hit occuring here will cause a
```

-continued

```
            //                              recovery where RAM and primary novram
            //                              will reflect the value prior to any
            //                              changes.
            meters[CREDITS] += winAmount; // <-A power hit in the middle of this will
            //                              have the same recovery as above.
            // <------------------------    A power hit in the middle of this will
            //                              have the same recovery as above.
            meters.Save1( ); // <---------  A power hit in the middle of this will
            //                              have the same recovery as above except
            //                              that the new meters values may or may
            //                              not be stored in transactional novram
            //                              memory. This doesn't matter because on
            //                              a powerfail recovery, the primary values
            //                              will be recovered and the meter update
            //                              will be performed exactly the same.
            // <------------------------    A power hit here will have already saved
            //                              the transactional novram memory; however,
            //                              just like above the primary data will
            //                              be recovered and this operation will be
            //                              performed again writing over the
            //                              transactional novram memory with the
            //                              same value.
            state = ADD2; // <------------  A powerhit in the middle of this will
            //                              either cause the atomic state update
            //                              operation to not be completed in which
            //                              case the same scenario as above will
            //                              apply.
            // <------------------------    A powerhit here means the state is
            //                              updated, and this state will not be
            //                              rentered but the primary novram and
            //                              RAM values will continue to reflect the
            //                              old meter values. Therefore, they should
            //                              never be used in the next state until
            //                              after a Save2( ) is performed.
        case ADD2:
            // <------------------------    A powerhit here is the same as above.
            meters.Save2( ); // <---------  A powerhit here will continue this
            //                              commit state upon recovery. The
            //                              transactional novram memory will be
            //                              copied to the primary novram memory and
            //                              the primary novram memory will be read
            //                              into RAM to reflect the update.
            // <------------------------    A power hit here will reperform the same
    }       //                              as the above.
}
```

Some of the main rules to remember when writing powerhit tolerant states are as follows.

1. Always split the states into two sections using an update and commit state.
2. The update state should include all modification to the novram object.
3. Any modifications to the novram object in the update state should be constant modifications which will perform the identical operation if a power hit occurs. In the above example, the winAmount added to the credit meter in the update state MUST be constant and remain the same across power hits.
4. The general rule of thumb when perform updates to the objects in the update state is to make sure that all input variables to the update are constant or have been stored in novram in a previous state.
5. The last line of the update state should set the state to the commit state.
6. The commit state should never use the novram or RAM values of the object until after the commit is performed. i.e. Save2 ( ).
7. The commit state should never modify RAM or novram values except to prepare for the next update state by saving input parameters to the next update state in other novram objects.
8. Multiple novram objects can be updated in the update state as long as the above rules are followed.
9. Multiple novram objects can be committed in the commit state.
10. Watch those input parameters as discussed in #3. Make sure they never can change throughout the state; otherwise, they will cause problems every time.

It should be understood that the present invention can be implemented in the form of control logic in either software or hardware or a combination of both.

The present invention has been partially described using flow charts. As will be understood by a person of ordinary skill in the art and with the benefit of the present disclosure, steps described in the flow charts can vary as to order, content, allocation of resources between steps, times repeated, and similar variations while staying fully within the inventive concepts disclosed herein.

Although the description above contains much specificity, the description should not be construed as limiting the scope of the invention; the descriptions given are merely providing an illustration of embodiments of the invention. The scope of this invention is determined by the appended claims and their legal equivalents.

What is claimed is:

1. A system for providing restoration of data in a gaming machine, the system comprising:
   a first and a second memory device for storing gaming data, wherein each of the first and second memory devices are equally-divided into two memory banks that have identical copies of stored gaming data in each memory bank, and wherein each memory bank includes variables that identify a processing state, wherein the variables are stored in a recoverable manner; and
   a control logic configured to execute a recovery algorithm to recover data due to a power failure, wherein the recovery algorithm uses the variables of each memory bank to identify the condition of a saved data file, wherein the recovery algorithm is variable-dependent.

2. The system of claim 1, wherein the first memory device and the second memory device are non-volatile memory devices.

3. The system of claim 2, wherein the second memory device is a battery-backed memory that appears as a normal file system.

4. The system of claim 1, wherein the variable further comprise sub-variables that further define the data file.

5. A method for providing data recovery in a gaming machine, the method comprising:
   providing a memory device having two equally-sized memory banks;
   saving data files in stages, wherein a portion of the data file is stored into each memory bank during each stage;
   generating a variable that identifies a state of the data file, wherein the variable is stored in a recoverable form so that a recovery algorithm is able to identify the condition of the data file;
   storing the variable with the saved data file;
   identifying the variable of the saved data file when power is interrupted; and
   reconstructing the data file with a variable-dependent recovery algorithm that is based on the variable of the saved data file.

6. The method of claim 5, wherein the memory device is a non-volatile memory device.

7. The method of claim 5, wherein reconstructing the data file further comprises:
   determining whether each copy of the saved data file is good or bad; and
   copying a good, saved data file over a bad, saved data file.

8. The method of claim 5, wherein reconstructing the data file further comprises:
   calculating checksums for each copy of saved data file in the memory banks;
   comparing the checksums for each copy of saved data file in the memory banks to a checksum retrieved from a non-volatile memory storage;
   determining whether each copy of the saved data file is good or bad; and
   copying a good, saved data file over a bad, saved data file.

* * * * *

UNITED STATES PATENT AND TRADEMARK OFFICE
CERTIFICATE OF CORRECTION

PATENT NO.        : 7,278,068 B1
APPLICATION NO.   : 10/794430
DATED             : October 2, 2007
INVENTOR(S)       : Robert W. Crowder, Jr.

It is certified that error appears in the above-identified patent and that said Letters Patent is hereby corrected as shown below:

In column 4
On line 3, replace "corn" with --com--
On line 16, replace "later" with --latter--

In column 7
On line 44, remove the word "is" after "that"

In column 9
On line 9, replace "corn" with --com--
On line 11, replace "corn" with --com-- in two places In column 10
On line 31, replace "an" with --a--

In column 11
On line 32, insert the word --to-- after "be able…"

In column 13
On line 28, replace "if" with --is--

In column 28
On line 50, replace "where" with --were--

In column 31
On line 41, replace "he" with --be--

In column 33
On line 30, replace "destroyes" with --destroys--
On line 34, replace "varible" with --variable--
On line 38, replace "coast" with --const--

UNITED STATES PATENT AND TRADEMARK OFFICE
CERTIFICATE OF CORRECTION

PATENT NO. : 7,278,068 B1
APPLICATION NO. : 10/794430
DATED : October 2, 2007
INVENTOR(S) : Robert W. Crowder, Jr.

It is certified that error appears in the above-identified patent and that said Letters Patent is hereby corrected as shown below:

In column 44
On line 17, replace "show" with --shown--

Signed and Sealed this

Twenty-fifth Day of December, 2007

JON W. DUDAS
*Director of the United States Patent and Trademark Office*